United States Patent
Narasimha et al.

(10) Patent No.: US 10,424,197 B2
(45) Date of Patent: Sep. 24, 2019

(54) APPARATUS, COMPUTER PROGRAM, AND METHOD FOR SUPPORTING VEHICLE-TO-VEHICLE COMMUNICATION UTILIZING A BASE STATION

(71) Applicant: Futurewei Technologies, Inc., Plano, TX (US)

(72) Inventors: Murali Narasimha, Vernon Hills, IL (US); Philippe Jean Marc Michel Sartori, Plainfield, IL (US); Vipul Desai, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 300 days.

(21) Appl. No.: 15/233,866

(22) Filed: Aug. 10, 2016

(65) Prior Publication Data

US 2018/0047284 A1     Feb. 15, 2018

(51) Int. Cl.
| | | |
|---|---|---|
| *G08G 1/09* | (2006.01) | |
| *H04W 4/46* | (2018.01) | |
| *G08G 1/01* | (2006.01) | |
| *G08G 1/0967* | (2006.01) | |
| *H04W 4/12* | (2009.01) | |
| *H04W 88/08* | (2009.01) | |
| *G08G 1/16* | (2006.01) | |
| *H04L 29/08* | (2006.01) | |

(52) U.S. Cl.
CPC ........... *G08G 1/093* (2013.01); *G08G 1/0112* (2013.01); *G08G 1/092* (2013.01); *G08G 1/094* (2013.01); *G08G 1/096775* (2013.01); *G08G 1/096791* (2013.01); *H04W 4/12* (2013.01); *H04W 4/46* (2018.02); *G08G 1/163* (2013.01); *H04L 67/12* (2013.01); *H04W 88/08* (2013.01)

(58) Field of Classification Search
CPC ............. G08G 1/093; G08G 1/096791; G08G 1/096775; G08G 1/094; G08G 1/0112; G08G 1/092; H04W 4/46; H04W 88/08; H04W 4/12
See application file for complete search history.

(56) References Cited

U.S. PATENT DOCUMENTS

| | | | | |
|---|---|---|---|---|
| 8,442,542 B2 * | 5/2013 | Brisebois et al. | .... | H04W 88/04 455/450 |
| 2005/0030897 A1 | 2/2005 | Sandhu | | |
| 2009/0234859 A1 | 9/2009 | Grigsby et al. | | |

(Continued)

FOREIGN PATENT DOCUMENTS

| | | |
|---|---|---|
| CN | 101032127 A | 9/2007 |
| CN | 104254053 A | 12/2014 |

*Primary Examiner* — Dale W Hilgendorf
(74) *Attorney, Agent, or Firm* — Slater Matsil, LLP

(57) ABSTRACT

An apparatus and method are provided for supporting vehicle-to-vehicle communication utilizing a base station. Included is a vehicular network interface configured to receive, from a first subset of a set of vehicles, first messages. The vehicular network interface is further configured to receive composite messages that are generated by a base station based on second messages transmitted by a second subset of the set of vehicles. Also included is circuitry in communication with the vehicular network interface. The circuitry is configured to re-create at least a portion of the second messages based on at least a portion of the first messages and at least a portion of the composite messages.

34 Claims, 16 Drawing Sheets

(56) References Cited

U.S. PATENT DOCUMENTS

2011/0034201 A1* 2/2011 Hamada et al. ............................ G08G 1/096791 455/517
2011/0143781 A1* 6/2011 Gehlen et al. ........ H04W 88/08 455/456.3
2013/0289859 A1 10/2013 Kim
2014/0379250 A1 12/2014 Noh et al.
2015/0195827 A1 7/2015 Feng et al.
2016/0021566 A1* 1/2016 Kimura et al. ....... H04W 88/08 370/329
2016/0080235 A1* 3/2016 Tan et al. ......... G08G 1/096791 370/235
2016/0275790 A1* 9/2016 Kang et al. ...... G08G 1/096791
2016/0285935 A1* 9/2016 Wu et al. ................ H04W 4/46
2016/0295624 A1* 10/2016 Novlan et al. ........ H04W 4/025
2016/0381539 A1* 12/2016 Park et al. ............ H04W 88/08 455/404.2

\* cited by examiner

| | | \multicolumn{8}{c}{Vehicle Receiving Message} |
|---|---|---|---|---|---|---|---|---|---|
| Vehicle transmitting message | | 1 | 2 | 3 | 4 | 5 | 6 | 7 | 8 |
| | 1 | × | | | x | | x | | X |
| | 2 | | × | | x | | x | | X |
| | 3 | | | × | | | | | |
| | 4 | x | x | | × | x | | | |
| | 5 | | | | x | × | | | |
| | 6 | x | x | | | | × | | |
| | 7 | | | | | | | × | |
| | 8 | x | x | | | | | | × |

APPARATUS, COMPUTER PROGRAM, AND METHOD FOR SUPPORTING VEHICLE-TO-VEHICLE COMMUNICATION UTILIZING A BASE STATION

FIELD OF THE INVENTION

The present invention relates to vehicle-to-vehicle communications, and more particularly, to vehicle-to-vehicle communications utilizing one or more base stations.

BACKGROUND

The vehicular industry is increasingly adding more systems for providing safety-related features. Next phase automotive safety systems, collectively known as intelligent transportation system (ITS), rely on interactions among vehicles, as well as interactions between vehicles and infrastructure. Examples of features enabled by such interactions include, but are not limited to, hazardous location warning (e.g. reporting a hazard by one vehicle to another vehicle), green light optimized speed advisory (GLOSA) which provide speed advisories to vehicles based on a time duration before which a green light at a signalized intersection will change, motorcycle warnings, emergency vehicle warnings, road work warnings, traffic jam warnings, etc.

As the capabilities of such systems evolve, additionally complex safety applications that are more communication-intensive will be deployed. Further, such safety applications demand that such messages are delivered with a very high reliability and very low latency. While IEEE 802.11p or Rel-14 LTE supports such messaging, it has significant limitations with respect to reliability and latency, particularly when vehicle density is high. Furthermore, as system capabilities and use-cases evolve, the required data rates are expected to be much higher than that which IEEE 802.11p or Rel-14 LTE can support.

In order to meet latency requirements, the communication path used in IEEE 802.11p is generally a direct vehicle-to-vehicle communication link. On the other hand, in order to meet reliability requirements on the vehicle-to-vehicle link, various techniques are employed such as low order modulation, low code rate, retransmissions, etc. However, these techniques generally result in inefficient operation and lower system capacity. There is thus a need for techniques that utilize both vehicle-to-vehicle direct communication and infrastructure-to-vehicle communication to overcome some of these issues.

SUMMARY

A base station apparatus and method are provided for supporting vehicle-to-vehicle communication. Included is a base station network interface configured to receive first messages from a first subset of a set of vehicles. The base station network interface is further configured to receive second messages from a second subset of the set of vehicles. Also included is circuitry in communication with the base station network interface. The circuitry is configured to generate composite messages based on the second messages. Still yet, the base station network interface is further configured to transmit the composite messages such that at least a portion of the second messages are capable of being re-created based on at least a portion of the first messages and at least a portion of the composite messages.

In a first embodiment, the composite messages may be generated by network coding the second messages.

In a second embodiment (which may or may not be combined with the first embodiment), the base station apparatus may be configured to receive measurements from at least some of the vehicles that are taken in association with signals received from other vehicles in the set of vehicles, and select the second messages for use in generating the composite messages, based on the measurements.

In a third embodiment (which may or may not be combined with the first and/or second embodiments), the base station apparatus may be configured to receive negative acknowledgement signals, and select the second messages for use in generating the composite messages, based on the negative acknowledgement signals. As an option, the negative acknowledgement signals may be each received during a time period corresponding to another time period of a transmission of one of the second messages. Further, the negative acknowledgement signals are received from different vehicles during the time period and may be aggregated in the form of an aggregated negative acknowledgement signal. As yet another option, the negative acknowledgement signals may each be received in response to a request transmitted by the base station. Further, the negative acknowledgement signals may each be received in the form of a bit map.

In a fourth embodiment (which may or may not be combined with the first, second, and/or third embodiments), the base station apparatus may be configured to receive the first messages and the second messages during a first time period, and transmit the composite messages during a second time period.

In a fifth embodiment (which may or may not be combined with the first, second, third, and/or fourth embodiments), the base station apparatus may be configured to assign each of the first subset of the set of vehicles with a receive timing for use by the first subset of the set of vehicles to schedule receipt of different messages from different vehicles, where the receive timing is based on a transmit timing advance and a guard period.

In a sixth embodiment (which may or may not be combined with the first, second, third, fourth, and/or fifth embodiments), the set of the vehicles may be identified based on a location of the second subset of the set of vehicles in relation to a geographical zone.

In a seventh embodiment (which may or may not be combined with the first, second, third, fourth, fifth, and/or sixth embodiments), the set of the vehicles may be identified based on a received power level of transmissions among the set of vehicles.

In an eighth embodiment (which may or may not be combined with the first, second, third, fourth, fifth, sixth, and/or seventh embodiments), the base station apparatus may be configured such that at least one of a storage or a processing of the first messages is avoided.

In a ninth embodiment (which may or may not be combined with the first, second, third, fourth, fifth, sixth, seventh, and/or eighth embodiments), the base station network interface may be further configured to transmit the composite messages to another base station network interface of another base station apparatus for use by the another base station apparatus. As an option, the base station network interface may be further configured to transmit the composite messages to the another base station network interface, based on measurements received from a plurality of the vehicles. As yet another option, the base station network interface may be further configured to transmit the composite messages to the another base station network interface, based on information (e.g. vehicle pair information, etc.) shared between the base station apparatus and the another base station apparatus.

Also provided is a vehicular apparatus and method for supporting vehicle-to-vehicle communication utilizing a base station. Included is a vehicular network interface configured to receive, from a first subset of a set of vehicles, first messages. The vehicular network interface is further configured to receive composite messages that are generated by a base station based on second messages transmitted by a second subset of the set of vehicles. Also included is circuitry in communication with the vehicular network interface. The circuitry is configured to re-create at least a portion of the second messages based on at least a portion of the first messages and at least a portion of the composite messages.

In a first embodiment, the second messages may not be received by the vehicular network interface. Further, as an option, the composite messages may be generated by network coding the second messages.

In a second embodiment (which may or may not be combined with the first embodiment), the vehicular apparatus may be configured to transmit, to the base station, measurements of signals received from at least some of the set of vehicles, for use by the base station in selecting the second messages to use when generating the composite messages. The signals may include reference signals received from at least some of the vehicles.

In a third embodiment (which may or may not be combined with the first and/or second embodiments), the vehicular apparatus may be configured to transmit negative acknowledgement signals for use by the base station in selecting the second messages to use when generating the composite messages. As an option, the negative acknowledgement signals may be each transmitted during a time period corresponding to another time period of a transmission of one of the second messages. Further, the negative acknowledgement signals transmitted by different vehicles during the time period may be aggregated in the form of an aggregated negative acknowledgement signal.

In a fourth embodiment (which may or may not be combined with the first, second, and/or third embodiments), the vehicular apparatus may be configured to receive the first messages and the second messages during a first time period, and receive the composite messages during a second time period.

In a fifth embodiment (which may or may not be combined with the first, second, third, and/or fourth embodiments), the vehicular apparatus may be configured to receive the first messages and the second messages utilizing a receive timing that is based on a transmit timing advance of the vehicular apparatus and a guard period.

In a sixth embodiment (which may or may not be combined with the first, second, third, fourth, and/or fifth embodiments), further provided is a mobile device method for supporting device-to-device communication utilizing a base station. Measurements are performed on reference signals transmitted by a set of mobile devices. Further, the measurements are transmitted to the base station. Various messages are received, including first messages transmitted by a first subset of the set of mobile devices, and composite messages from the base station. Second messages are recovered based on the first messages and the composite messages, in case the second messages are transmitted by a second subset of the set of mobile devices but not received. As an option, the composite messages may include the second messages transmitted by at least a portion of the second subset of the set of mobile devices for which the measurements are below a threshold.

Also provided is another apparatus (and associated method) that may or may not be combined with any of the embodiments described hereinabove. Included is a base station network interface configured to receive messages from a set of vehicles, and receive measurements from at least some vehicles of the set of vehicles. Still yet, circuitry is in communication with the base station network interface. Such circuitry is configured to select a subset of the messages, based on the measurements, and further transmit at least a portion of the subset of the messages to one or more vehicles of the set of vehicles.

In a first embodiment, the measurements may be generated based on reference signals communicated among different vehicles of the set of vehicles. As a further option, the at least portion of the subset of the messages may be transmitted in a form of at least one composite message.

In a second embodiment (which may or may not be combined with the first embodiment), the measurements may comprise probabilities of reception of hypothetical transmissions among different vehicles of the set of vehicles. As an option, the hypothetical transmissions may be characterized by a predefined size, a predefined transmit power, and/or a predefined modulation and coding scheme.

In a third embodiment (which may or may not be combined with the first and/or second embodiments), the messages may be received from the set of vehicles in a first time period, and the messages may be stored at least until the selection of the subset of the messages. As a further option, the at least portion of the subset of the messages may be transmitted in a second time period occurring after the first time period.

In a fourth embodiment (which may or may not be combined with the first, second, and/or third embodiments), the subset of the messages may be selected prior to receiving the messages. As an option, the messages may be received from the set of vehicles during a first time period, and the messages may be stored if the received messages are included in the subset of messages. The at least portion of the subset of the messages may be transmitted in a second time period occurring after the first time period.

Also provided is another apparatus that may or may not be combined with any of the embodiments described hereinabove. Included is a first mobile device including a network interface configured to receive a reference signal transmitted by a second mobile device. The first mobile device further includes circuitry in communication with the network interface. Such circuitry is configured to perform, at the first mobile device, a measurement of the reference signal transmitted by the second mobile device. The network interface is further configured to transmit the measurement to a base station. Still yet, the network interface is configured to receive, if the measurement is below a threshold, a message from the base station, in case the message is transmitted by the second mobile device but not received by the first mobile device.

Even still provided is another method that may or may not be combined with any of the embodiments described hereinabove. At a first mobile device, a measurement is performed on a reference signal transmitted by a second mobile device. The measurement is transmitted to a base station. Further, if the measurement is below a threshold, a message is received from the base station, in case the message is transmitted by the second mobile device but not received by the first mobile device.

In a first embodiment, the apparatus may be further configured such that the measurement is performed by measuring a signal power of the reference signal transmitted by the second mobile device, and determining a probability of error of a hypothetical packet transmission. The measurement that is transmitted to the base station may include the probability of error of the hypothetical packet transmission.

In a second embodiment (which may or may not be combined with the first embodiment), the apparatus may be further configured such that the hypothetical transmission is characterized by a predefined size, a predefined transmit power, and/or a predefined modulation and coding scheme.

Also provided is yet another apparatus (and associated method) that may or may not be combined with any of the embodiments described hereinabove. Included is a vehicular network interface configured to receive a transmit timing advance from a base station. Also included is circuitry in communication with the vehicular network interface. Such circuitry is configured to control message transmission to one or more vehicles utilizing the vehicular network interface, based on the transmit timing advance. Further, such circuitry is configured to control message receipt from at least one of the vehicles utilizing the vehicular network interface, based on the transmit timing advance and a guard period.

In a first embodiment, the message receipt may be controlled by identifying a start time of a reception window, based on the transmit timing advance and the guard period. Further, as an option, the guard period is between successive frames in a sequence of frames.

Also provided is yet another apparatus that may or may not be combined with any of the embodiments described hereinabove. Provided is a base station including a base station network interface and circuitry in communication with the base station network interface. The base station is configured to receive a first transmission from a first mobile device during a first time period. The base station is further configured to receive a second transmission from a second mobile device during a second time period following a guard period after the first time period. In use, the base station refrains from transmissions during the guard period. Further, a length of the guard period is based on a maximum propagation delay corresponding to the base station.

Even still provided is yet another method that may or may not be combined with any of the embodiments described hereinabove. In operation, a first transmission is received from a first mobile device during a first time period. Further, a second transmission is received from a second mobile device during a second time period following a guard period after the first time period. In use, a base station refrains from transmissions during the guard period. Further, a length of the guard period is based on a maximum propagation delay corresponding to the base station.

In a first embodiment, the first mobile device and the second mobile device may belong to a set of mobile devices, and the first transmission and the second transmission are transmissions may be directed to other mobile devices in the set of mobile devices.

In a second embodiment (which may or may not be combined with the first embodiment), the base station may be further configured to receive a third transmission directly from a third mobile device during a third time period occurring prior to the first time period. No guard period is used between the third time period and the first time period.

To this end, in some optional embodiments, one or more of the foregoing features of the aforementioned apparatuses and/or methods may enable more reliable vehicle-to-vehicle communications by employing one or more base stations to send composite messages that may be used to re-create vehicle-to-vehicle messages that have failed. Further, this may be accomplished in a manner that reduces the overall load on a network (that would, for example, result from simply relaying/resending multiple message copies via such base station(s)). Specifically, the number of the composite messages may, in various embodiments, be less than that which would be required to relay/resend multiple copies of the original messages. This may, in turn, result in an increase in reliability that does not necessarily result in a proportional increase in network overhead. It should be noted that the aforementioned potential advantages are set forth for illustrative purposes only and should not be construed as limiting in any manner.

DETAILED DESCRIPTION

Figure 1:
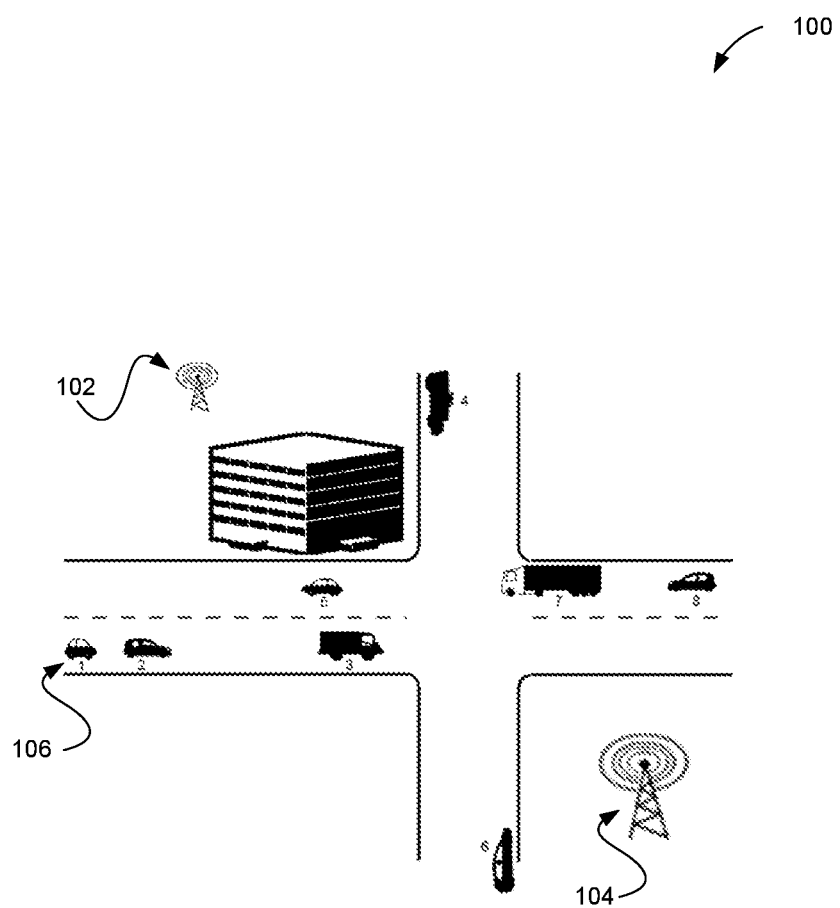
FIG. 1 illustrates a system for supporting vehicle-to-vehicle communication utilizing one or more base stations, in accordance with one vehicle embodiment.

FIG. 1 illustrates a system 100 for supporting vehicle-to-vehicle communication utilizing one or more base stations, in accordance with one vehicle embodiment. As shown, a first base station 102 and, optionally, other base stations, such as second base station 104, are provided and which are configured for communicating with a plurality of vehicles 106. Non-limiting examples of the base stations 102, 104 may include a Node B, multi-standard radio (MSR) radio node such as an MSR base station, eNode B, network controller, radio network controller (RNC), base station controller (BSC), relay, donor node controlling relay, base transceiver station (BTS), access point (AP), transmission point, transmission nodes, remote radio unit (RRU), remote radio head (RRH), node in a distributed antenna system (DAS), a cell, and/or any other node that is configured for communicating with the vehicles 106 over a network. In various optional embodiments, the base stations 102, 104 may be specifically deployed for vehicular communications [e.g. in the form of a road side unit (RSU), etc.], or be a general purpose base station used for communications other than vehicle-to-vehicle communications. To accomplish this, each of the base stations 102, 104 may include a base station network interface for wirelessly communicating over the aforementioned network under the control of circuitry (e.g. processor(s), hardware, circuit(s), etc.). In use, the base stations 102, 104 may also communicate with each other, for example wirelessly, or through interfaces such as an X2 interface.

Further, the vehicles 106 may include any automobile, industrial vehicle, motorcycle, and/or any other mobile apparatus that is equipped with at least a network interface (e.g. receiver, transmitter, transceiver, etc.) for wirelessly communicating over the aforementioned network under the control of circuitry. It should be noted that the various embodiments disclosed herein may apply to other mobile devices beyond vehicles including, but not limited to user equipment (UE), personal digital assistant (PDA), iPAD™, tablet, mobile terminal, smart phone, laptop embedded equipped (LEE), laptop mounted equipment (LME), universal serial bus (USB) dongle, and/or and any other type of wireless device.

Further, in various embodiments, such network may include any network where a mobile device is capable of being served by different cells. For example, such network may include a fourth generation (4G)/LTE/LTE-Advanced network, a fifth generation (5G)/new radio (NR) network and/or any other advancement/permutation thereof. It should be noted, however, that the system 100 may be implemented using other radio access technology (RAT) networks (e.g. WiFi) as well.

With continuing reference to FIG. 1, a number (e.g. eight) of the vehicles 106 (numbered 1-8) are shown sharing on a road. In use, such vehicles 106 periodically transmit messages including types of information, utilizing the network interface thereof. Such information may include, but is not limited to, speed, location, direction, environment, a vehicle condition, and/or any other information, for that matter. In one embodiment, a message from any one of the vehicles 106 vehicle is intended to be received by all other of the vehicles 106 (i.e. the messages are broadcast).

In various embodiments, a communications link from the base station 102 to one of the vehicles 106 may be referred to as a downlink, while a communications link from one of the vehicles 106 to the base station 102 may be referred to as an uplink, and a communications link from one of the vehicles 106 to another one of the vehicles 106 may be referred to as a side-link. Further, the term Uu link may refer to a data plane link on the uplink or downlink. Still yet, the term PC5 link may refer to the data plane link on the side-link.

In one possible embodiment, vehicle-to-vehicle communication is scheduled by the base station(s) 102, 104. For example, resources for transmission by the vehicles 106 may be allocated by the base station(s) 102, 104. In particular, the base station 102 may effect scheduling using a downlink control information (DCI) transmitter on a physical downlink control channel (PDCCH) or enhanced PDCCH (EPDCCH). Further, the scheduling information may include frequency resources, time resources, and/or a modulation control scheme. The base station 102 may also allocate resource pools, such as a transmit pool (which indicates time and frequency resources where a vehicle 106 can transmit), and a receive pool (which indicates time and frequency resources where a vehicle 106 can receive). Such transmit and receive pools can overlap in time and frequency. In addition, the transmit pool (as well as the receive pool) can be classified into a scheduling assignment pool and a data pool.

In use, a transmitting vehicle sends side-link control information (SCI) using the physical side-link control channel (PSCCH) in the scheduling assignment pool. The SCI may contain information indicating the time and frequency resources of the data pool for transmission of data using the physical side-link shared channel (PSSCH). Further, higher layer signaling [e.g. radio resource control (RRC) protocols] may be used to configure each vehicle 106 with information regarding the pools. Higher layer signaling can also be broadcasted by the base station 102 using a system information broadcast (SIB) which may be transmitted on the physical downlink shared channel (PDSCH). Still yet, a time-division multiplexing approach may be used for vehicle transmissions, for enabling all of the vehicles 106 to listen to a signal of a particular transmitting vehicle. In other embodiments, however, a full-duplex approach may be implemented. For example, if vehicle 1 and vehicle 2 transmit in the same time period, vehicle 1 may cancel its signal from the combined signal to obtain signal of vehicle 2, and vice-versa (in a form of interference cancellation).

Figure 2:
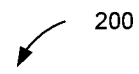
FIG. 2 illustrates a table showing pair-wise message reception information for each message, in accordance with one vehicle embodiment.

For a variety of reasons (e.g. environmental obstacles, interference, etc.), however, not all messages transmitted by one of the vehicles 106 are received by all other of the vehicles 106. To illustrate such a scenario, FIG. 2 illustrates a table 200 showing pair-wise message reception information for each message transmitted from each of the vehicles 106 (numbered 1-8) to each of the other vehicles 106 (again, numbered 1-8). As will become apparent during the description of subsequent embodiments, the information in table 200 may represent either: a likelihood of not receiving messages (i.e. based on prior measurements), or messages that have actually not been received [i.e. based on synchronized negative acknowledgements (NACKs), etc.].

In table 200, a successful message reception between a particular pair of the vehicles 106 is denoted by a blank entry, while an unsuccessful message reception among the particular pair of the vehicles 106 is denoted by an "x". For example, a message transmitted by vehicle 1 is received by all vehicles other than vehicles 4, 6 and 8, a message transmitted by vehicle 6 is received by all vehicles other than vehicles 1 and 2, and so forth. Further, a large "X" is used to designate a message sent/received by the same vehicle (i.e. a vehicle knows the message it transmitted). More information will now be set forth regarding various techniques for utilizing one or more of the base stations 102, 104 for addressing unsuccessful message receptions such as those that are denoted by the "x"'s in table 200.

Figure 3:
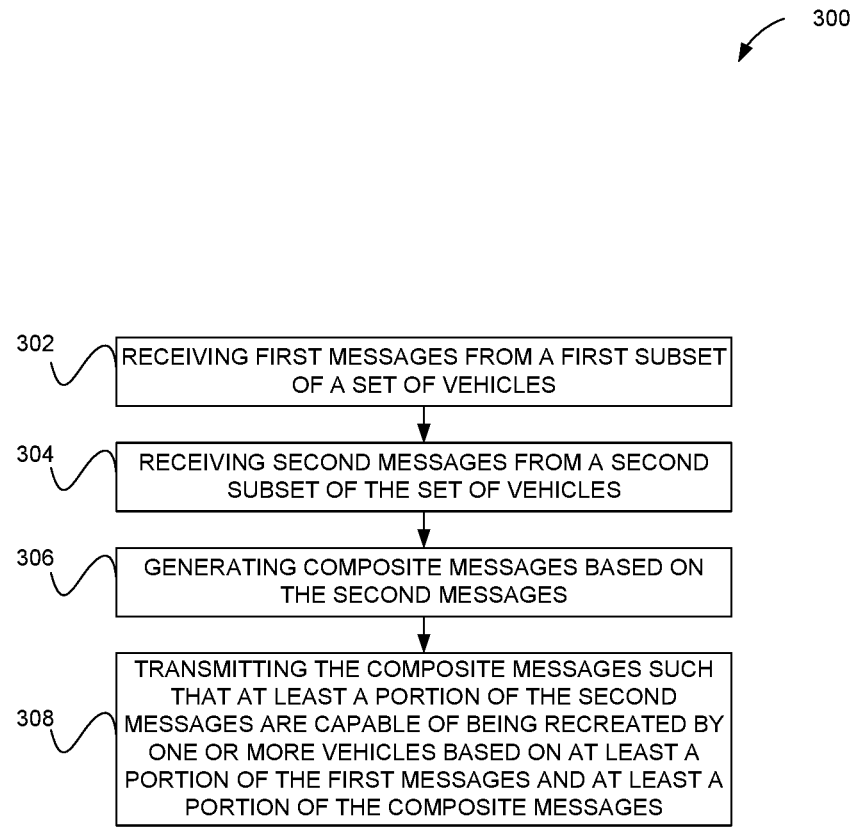
FIG. 3 shows a base station method for supporting vehicle-to-vehicle communication utilizing a base station, in accordance with one embodiment.

FIG. 3 shows a base station method 300 for supporting vehicle-to-vehicle communication utilizing a base station, in accordance with one embodiment. As an option, the method 300 may be implemented in the context of any one or more of the embodiments set forth in any previous and/or subsequent figure(s) and/or description thereof. For example, the method 300 may be carried out in the context of one or more of the base stations 102, 104 (e.g. base station apparatus, etc.) of the system 100 of FIG. 1. However, it is to be appreciated that the method 300 may be implemented in the context of any desired environment.

As shown, in step 302, first messages are received from a first subset of a set of vehicles (e.g. the vehicles 106 of FIG. 1, etc.). In one embodiment, such first messages may be received at a base station network interface of a particular base station (e.g. one of the base stations 102, 104 of FIG. 1). The messages may be received by the base station monitoring messages on a vehicle-to-vehicle communication channel (e.g. PSSCH). That is, the messages may not be specifically directed to the base station, and may instead be directed to the set of vehicles. The resources used for such vehicle to vehicle communication may be explicitly indicated to the vehicles and distinguished from resources used for vehicle to base station communication. In another embodiment, the vehicles may be directed by the base station to transmit messages to the base station using the physical uplink shared channel (PUSCH). Further, other vehicles may be able to receive those messages. Typically, uplink messages are unicast (sent by one vehicle to the base station); there may be specific parameters for the PUSCH, e.g. scrambling, that can make receiving PUSCH by vehicles difficult. In order to other vehicles to receive PUSCH, those parameters need to be made available to the other vehicles. The base station can signal such specific parameters, including the resources for the PUSCH transmission by a vehicle, to other vehicles. Alternatively, the base station can request the vehicle to send its message on the PSSCH. Further, other vehicles may be able to receive those messages. Additionally, such first messages may include any information that may or may not be used by the vehicles.

Further, in step 304, second messages are received by the base station (via the same or different network interface) from a second subset of the set of vehicles. In various embodiments, some or all of the second messages may not necessarily be successfully received by one or more of the vehicles. It should be noted that the first and second messages may or may not be of the same type, format, etc. and both may take any form (e.g. packets or any other encapsulation, etc.).

In step 306, composite messages are generated based on the second messages received in step 304. Note the base station can concatenate (group) the composite messages into an overall message which is then transmitted to the vehicles. The benefit of an overall message is that one PDSCH is used (albeit it is larger in size) than using a sequence for PDSCHs for the composite messages. This may be accomplished utilizing (e.g. under the control of, etc.) circuitry in communication with the base station network interface. In the context of the present description, such composite messages may include any messages that are generated by the base station based on the second messages.

For example, in one possible embodiment that will be described later, the composite messages may include network coded messages. In the context of the present description, network coded messages are generated from messages which have at least a predetermined probability of not being received by at least one vehicle. By this definition, the network coded messages are also inclusive of those that are generated from messages which have actually not been received by at least one vehicle. Further, in various embodiments, the composite messages may comprise and/or be derived from the original second messages that have at least a predetermined probability of not being received by at least one vehicle.

As a further option in the context of such embodiment, such network coded messages may be linearly independent. As another option, Raptor codes and fountain codes may be used for such network coding. Further, the coding may be possibly configured such that a first number of network coded messages is less than a second number of the second messages that were used to generate the network coded messages.

In operation, the base station may generate such composite messages in any desired manner. For example, in one embodiment, the base station may itself generate the composite messages. However, in other embodiments, the base station may generate the composite messages by causing or controlling such composite message generation using other local and/or remote computing resources available to the base station.

In various embodiments, the vehicles may be identified by the base station in any desired manner, so that the messages may be received therefrom for selection of the second messages (e.g. by distinguishing the second messages from the first messages) for the composite message generation of step 306. By this design, the composite message generation of step 306 may be carried out using, for example, information such as that illustrated in the table 200 of FIG. 2. For example, in one possible embodiment, the set of the vehicles may be identified based on a location of the second subset of the set of vehicles in relation to a geographical zone. In another embodiment, the set of the vehicles may be identified based on a power level of signaling in association with the set of the vehicles. More information regarding such embodiments will be set forth later during the description of subsequent figures.

Similar to the manner in which the set of vehicles is identified, the second messages may be selected (for the composite message generation), in any desired manner. For example, in one optional embodiment, the base station apparatus may be configured to: receive measurements from at least some of the vehicles associated with signals transmitted by other vehicles, and select the second messages, based on such measurements. In another possible embodiment, the base station apparatus may be configured to receive NACK signals, and select the second messages for use in generating the composite messages, based on the NACK signals. More information regarding such embodiments will be set forth later during the description of subsequent figures.

To this end, the second messages (to be used for composite message generation) may be selected in any desired manner that increases the chance that the composite messages will take into account messages that are likely to be the subject of an unsuccessful reception. In some embodiments (e.g. that utilize the aforementioned measurement-based approach), the second messages may include messages that are (or are likely to be) the subject of unsuccessful message reception at one or more vehicles. In other embodiments (e.g. that use the aforementioned NACK approach), the second messages (that are used for composite message generation) may only include those messages that are actually the subject of unsuccessful message reception at one or more vehicles.

To this end, the composite messages are transmitted in step 308 such that at least a portion of the second messages are capable of being re-created by one or more vehicles, based on at least a portion of the first messages and at least a portion of the composite messages. To this end, the relevant second message(s) may be recovered in case such second message(s) are transmitted, but not received. In various embodiments, the composite messages may be transmitted utilizing the same or different network interface via which the first and/or second messages are received per steps 302-304. Strictly as an option that will be elaborated upon in later embodiments, the base station apparatus may be configured to receive the first messages and the second messages during a first time period, and transmit the composite messages during a second time period.

Specifically, in various optional embodiments, the messages may be received in step 302 in a first time period, and the messages may be stored at least until the selection of the subset of the messages in connection with step 306. As a further option, the at least portion of the subset of the messages may be transmitted (per step 308) in a second time period occurring after the first time period.

Further, while a particular order is shown in FIG. 3, the subset of the messages may be selected (in connection with step 306) prior to receiving the messages in step 302. As a further option, the messages may be received from the set of vehicles during a first time period, and the messages may be stored if the received messages are included in the subset of messages. Still yet, at least portion of the subset of the messages may be transmitted in a second time period occurring after the first time period.

More information will now be set forth regarding one possible method by which the at least portion of the second messages may be re-created by one or more vehicles upon receipt of the composite messages.

Figure 4:
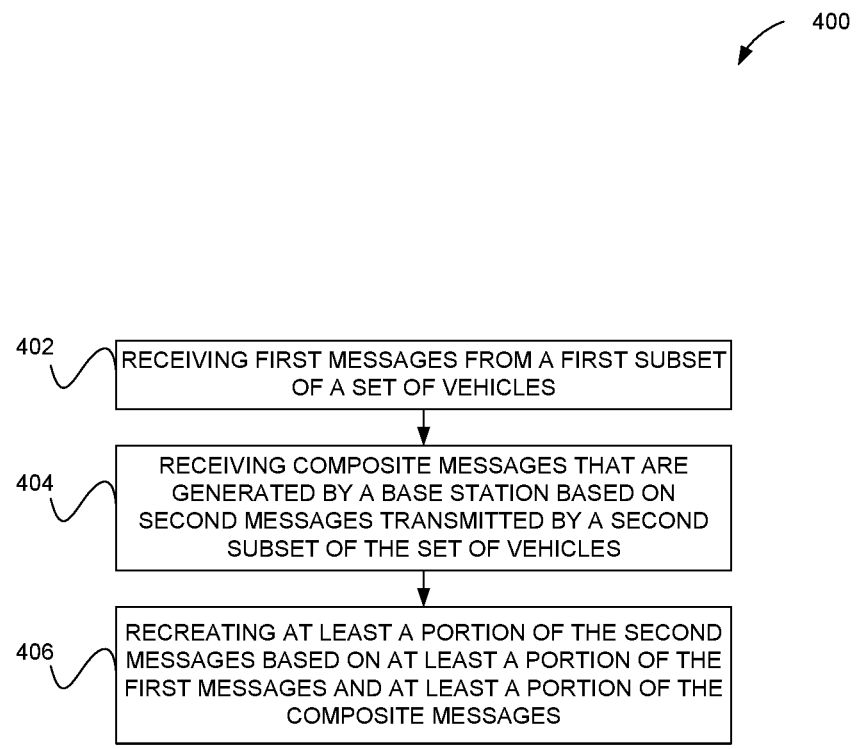
FIG. 4 shows a vehicular method for supporting vehicle-to-vehicle communication utilizing a base station, in accordance with one embodiment.

FIG. 4 shows a vehicular method 400 for supporting vehicle-to-vehicle communication utilizing a base station, in accordance with one embodiment. As an option, the method 400 may be implemented in the context of any one or more of the embodiments set forth in any previous and/or subsequent figure(s) and/or description thereof. For example, the method 400 may be carried out in the context of one or more of the vehicles 106 (i.e. vehicular apparatus, etc.) of the system 100 of FIG. 1. However, it is to be appreciated that the method 400 may be implemented in the context of any desired environment.

As shown, in step 402, first messages are received from a first subset of a set of vehicles (e.g. the vehicles 106 of FIG. 1, etc.). In one embodiment, such first messages may be received utilizing a vehicular network interface of a particular vehicle. As mentioned earlier, such first messages may include any information that may or may not be used by the particular vehicle.

In various possible embodiments, the particular vehicle may be informed about a number of messages that it should receive. For example, a base station (e.g. the base stations 102, 104 of FIG. 1, etc.) may transmit such number to the particular vehicle, prior to the particular vehicle receiving any messages. During a particular time period, all vehicles may transmit messages, and messages successfully received by the particular vehicle thus form the aforementioned first messages. In contrast, messages not successfully received by the particular vehicle may be considered second messages, as will soon become apparent. In use, the base station and the particular vehicle may have different messages in association with the foregoing first messages (and likewise for the second messages).

In step 404, composite messages are received (via the same or different network interface). As mentioned earlier, such composite messages may include any messages that are generated by a base station based on second messages transmitted by a second subset of the set of vehicles. Further, such second messages may include messages that are the subject of an unsuccessful message reception (i.e. where the message is not received, received in a manner that renders the message unusable, or is unlikely to be received). Still yet, in various embodiments, the base station may receive the second messages for all vehicles (where such second messages may be different for different vehicles). In one possible embodiment, the vehicular apparatus may be configured to receive the first messages during a first time period, and receive the composite messages during a second time period.

To this end, in step 406, at least a portion of the second messages are re-created, based on at least a portion of the first messages and at least a portion of the composite messages. In one embodiment, such re-creation may be carried out utilizing circuitry in communication with the vehicular network interface. Further, in the context of the present description, the re-creation may include any operation whereby the composite message is utilized, at least in part, for re-creating at least a part of one or more of the second messages that was the subject of an unsuccessful message reception.

As mentioned earlier, the composite messages may, in one embodiment, include network coded messages. In such an embodiment, the circuitry associated with the vehicle may be configured for re-creating the at least a portion of the second messages, by decoding the composite messages.

As was also mentioned earlier, the base station may be configured to receive measurements from vehicles, and select the second messages (for composite message generation), based on such measurements. To support such capability, the vehicular apparatus may be configured to transmit measurements (or measurement reports) to the base station for use by the base station in selecting the second messages to use when generating the composite messages. Still yet, such measurements may be generated based on one or more reference signals received from at least some of the vehicles. For example, one or more measurements may be received from another vehicle and such measurement(s) may be combined (or otherwise processed with) the measurements of the present vehicle, so that a combined measurement may be sent to the base station. In another example, a vehicle may make a measurement and then compare the measurement to a threshold (predefined or configured by the base station/network). The vehicle may then report a result of the comparison. More information regarding one or more of such embodiments will be set forth later during the description of subsequent figures.

As was yet also mentioned earlier, the base station apparatus may be configured to receive NACK signals, and select the second messages for use in generating the composite messages, based on the NACK signals. To support such feature, the vehicular apparatus may be configured to transmit NACK signals for use by the base station in selecting the second messages to use when generating the composite messages. Again, more information regarding such embodiment will be set forth later during the description of subsequent figures.

To this end, in some optional embodiments, one or more of the foregoing features may enable more reliable vehicle-to-vehicle communications by employing one or more base stations to send composite messages that may be used to re-create vehicle-to-vehicle messages that have failed. Further, this may be accomplished in a manner that reduces the overall load on a network (that would, for example, result from simply relaying/resending one or more message copies via such base station(s)). Specifically, the number of the composite messages may, in various embodiments, be less than that which would be required to relay/resend multiple copies of the original messages. This may, in turn, result in an increase in reliability that does not necessarily result in a proportional increase in network overhead. It should be noted that the aforementioned potential advantages are set forth for illustrative purposes only and should not be construed as limiting in any manner.

To illustrate this with a specific example in the context of the scenario outlined in the table 200 of FIG. 2, the base station may generate composite messages including messages sent from vehicles 1, 2, 4, 5, 6 and 8, since it is those vehicles that were the originators of messages that were unsuccessfully received at at least one vehicle. Further, in the context of an embodiment where the aforementioned network coding is utilized, the base station may broadcast three (3) linearly independent network coded messages.

Given that vehicle 1 has already received the transmissions from vehicles 2, 3, 5 and 7, vehicle 1 uses the three network coded messages and its own message to recover messages 4, 6 and 8. Similarly, vehicle 2 recovers messages from vehicles 4, 6 and 8. Vehicle 4 uses the already received messages from vehicles 3, 6, 7 and 8, and the three network coded messages to recover messages 1, 2 and 5. Vehicle 5 needs just one of network coded messages to recover the message from vehicle 4 and vehicles 6 and 8 each need just two of the network coded messages to recover messages from vehicles 1 and 2. Thus, instead of performing at least six (6) retransmissions of messages (via vehicle-to-vehicle links), the above approach achieves the same goal by transmitting three (3) network coded messages from the base station. Further, no additional overhead is incurred in transmitting the messages to the base station, thus increasing efficiency.

More illustrative information will now be set forth regarding various optional architectures and uses in which the foregoing method may or may not be implemented, per the desires of the user. For example, a specific network coding scheme will be described for affording the optional benefits outlined in the aforementioned example. Again, it should be noted that the following information is set forth for illustrative purposes and should not be construed as limiting in any manner. Any of the following features may be optionally incorporated with or without the exclusion of other features described.

As mentioned earlier, the composite messages may include network coded messages (e.g. packets, etc.). Given packets $P_1, P_2, \ldots, P_n \in GF(K)$ (where GF(K) indicates a Galois field of size K), a network coded packet $N_i$ based on $P_1, P_2, \ldots, P_n$ may be generated per Equation 1.

$$N_i = [\alpha_{i,1} \alpha_{i,2} \ldots \alpha_{i,n}] \times [P_1 P_2 \ldots P_n]^T, \text{ where} \quad \text{Equation 1:}$$

coefficients $\alpha_{i,1}, \alpha_{i,2}, \ldots, \alpha_{i,n} \in GF(K)$.

In various embodiments, the aforementioned coefficients may be predetermined and pre-installed on both the vehicles and the base station(s). In other embodiments, such coefficients may be distributed in advance, by the base station(s), for use by the vehicles.

Given this, suppose a vehicle has already received the packets $P_{r_1}, P_{r_2}, \ldots, P_{r_k} \in \{P_1, P_2, \ldots, P_n\}$ and needs to recover $P_{u_1}, P_{u_2}, \ldots, P_{u_t} \in \{P_1, P_2, \ldots, P_n\}$ from the network coded packets. Also suppose that the vehicle has received network coded packets $N_1, N_2, \ldots, N_t$ that are generated per Equation 1. Equation 2 shows a relationship between the network coded packets, the already received packets, and the packets the vehicle needs to recover.

$$\begin{bmatrix} N_1 \\ N_2 \\ \vdots \\ N_t \end{bmatrix} \begin{bmatrix} \alpha_{1,r_1} & \alpha_{1,r_2} & \cdots & \alpha_{1,r_k} \\ \alpha_{2,r_1} & \alpha_{2,r_2} & \cdots & \alpha_{2,r_k} \\ \vdots & \vdots & \vdots & \vdots \\ \alpha_{t,r_1} & \alpha_{t,r_2} & \cdots & \alpha_{t,r_k} \end{bmatrix} \times \quad \text{Equation 2}$$

$$\begin{bmatrix} P_{r_1} \\ P_{r_2} \\ \vdots \\ P_{r_k} \end{bmatrix} = \begin{bmatrix} \alpha_{1,u_1} & \alpha_{1,u_2} & \cdots & \alpha_{1,u_t} \\ \alpha_{2,u_1} & \alpha_{2,u_2} & \cdots & \alpha_{2,u_t} \\ \vdots & \vdots & \vdots & \vdots \\ \alpha_{t,u_1} & \alpha_{2,u_2} & \cdots & \alpha_{t,u_t} \end{bmatrix} \times \begin{bmatrix} P_{u_1} \\ P_{u_2} \\ \vdots \\ P_{u_t} \end{bmatrix}$$

Thus, $P_{u_1}, P_{u_2}, \ldots, P_{u_t}$ can be recovered via Equation 3.

$$\begin{bmatrix} P_{u_1} \\ P_{u_2} \\ \vdots \\ P_{u_t} \end{bmatrix} = \begin{bmatrix} \alpha_{1,u_1} & \alpha_{1,u_2} & \cdots & \alpha_{1,u_t} \\ \alpha_{2,u_1} & \alpha_{2,u_2} & \cdots & \alpha_{2,u_t} \\ \vdots & \vdots & \vdots & \vdots \\ \alpha_{t,u_1} & \alpha_{2,u_2} & \cdots & \alpha_{t,u_t} \end{bmatrix}^{-1} \quad \text{Equation 3}$$

$$\left( \begin{bmatrix} N_1 \\ N_2 \\ \vdots \\ N_t \end{bmatrix} - \begin{bmatrix} \alpha_{1,r_1} & \alpha_{1,r_2} & \cdots & \alpha_{1,r_k} \\ \alpha_{2,r_1} & \alpha_{2,r_2} & \cdots & \alpha_{2,r_k} \\ \vdots & \vdots & \vdots & \vdots \\ \alpha_{t,r_1} & \alpha_{t,r_2} & \cdots & \alpha_{t,r_k} \end{bmatrix} \times \begin{bmatrix} P_{r_1} \\ P_{r_2} \\ \vdots \\ P_{r_k} \end{bmatrix} \right)$$

Figure 5:
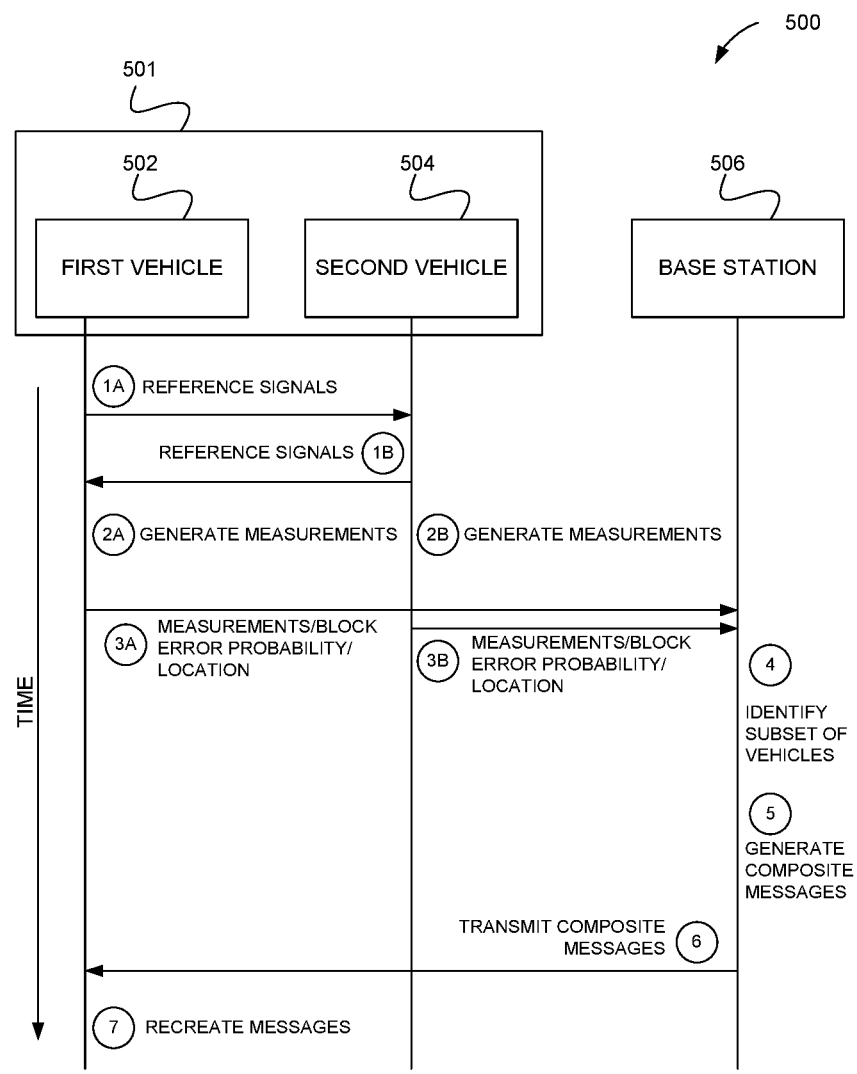
FIG. 5 illustrates a framework for selecting a set of messages to generate a composite message using a measurement-based approach, in accordance with one embodiment.

FIG. 5 illustrates a framework 500 for selecting a set of messages to generate a composite message using a measurement-based approach, in accordance with one embodiment. As an option, the framework 500 may be implemented in the context of any one or more of the embodiments set forth in any previous and/or subsequent figure(s) and/or description thereof. For example, the framework 500 may be used to select the "second" subset of messages in connection with the methods 300, 400 of FIGS. 3 and 4. However, it is to be appreciated that the framework 500 may be implemented in the context of any desired environment.

As shown, the framework 500 includes a set of vehicles 501 inclusive of a first vehicle 502 and a second vehicle 504. As will soon become apparent, the second vehicle 504 is a vehicle that will be subsequently determined to be one of those that are likely to and/or actually generate one or more messages with an unsuccessful reception at one or more other vehicles. Also included is a base station 506 which is, at the onset (time=0), aware of the set of vehicles 501, but not aware of which of the set of vehicles 501 will be likely to and/or actually generate one or more messages with an unsuccessful reception at one or more other vehicles.

To gain insight into such distinction, the set of vehicles 501 each transmit reference signals to each other per operations 1A/1B. Based on such reference signals, each of the set of vehicles 501 take measurements in operations 2A/2B. Such measurements may, for example, gauge a power level of the reference signals and/or any other aspect thereof that is indicative of a strength and/or quality of a connection between vehicles in the set of vehicles 501 and is, thus, indicative of a likelihood of an unsuccessful reception. In one embodiment, this may be accomplished by identifying vehicles whose transmitted packets have a probability of reception (by at least one other vehicle) that is lower than a predetermined threshold. Thereafter, such measurements are reported by the set of vehicles 501 to the base station 506 in operations 3A/3B, as shown.

With continuing reference to FIG. 5, the base station 506 identifies a subset of the set of vehicles 501 based on the measurements reported, as indicated by operation 4, for use in composite message generation. In the present embodiment, such subset may include, among others, the second vehicle 504. Further, the subset of the set of vehicles 501 may correspond to the "second" subset of vehicles referenced during the description of FIGS. 3 and 4.

To this end, in operation 5, the base station 506 generates the composite messages utilizing messages (not shown) received from the subset of the set of vehicles 501, including the second vehicle 504. Further, such composite messages are transmitted to each of the set of vehicles 501 in operation 6. The composite messages may be broadcast by the base station 506 such that several or all of the vehicles in the set of vehicles 501 are able to receive the composite messages. For example, the composite message may have a group identifier that enables several vehicles to receive and decode the composite message. By this design, any one or more of the set of vehicles 501 is capable of re-creating any messages transmitted by the second vehicle 504 that were the subject of an unsuccessful reception at any one or more of the set of vehicles 501.

Thus, in order to enable the base station 506 to appropriately identify the aforementioned subset of the set of vehicles 501, each of the set of vehicles 501 performs measurements of signals of another set of vehicles 501, and such measurements are reported to the serving base station 506 according to defined procedures. More information will be set forth regarding the aforementioned reference signals of operations 1A/1B, during reference to FIG. 6.

Before such discussion, however, it should be noted that the foregoing measurement reporting framework may be used in other embodiments, without necessarily using composite messages and/or any other features described herein. For example, in such embodiment, a base station network interface may be configured to receive messages from a set of vehicles, and receive measurements from at least some vehicles of the set of vehicles. Still yet, circuitry (in communication with the base station network interface) may be configured to select a subset of the messages, based on the measurements, and further transmit at least a portion of the subset of the messages to one or more vehicles of the set of vehicles. Thus, which messages (to be included in the subset) or any portion thereof may be selectively transmitted (e.g. re-transmitted) by the base station. As mentioned earlier, the measurements may be generated based on reference signals communicated among different vehicles of the set of vehicles.

Figure 6:
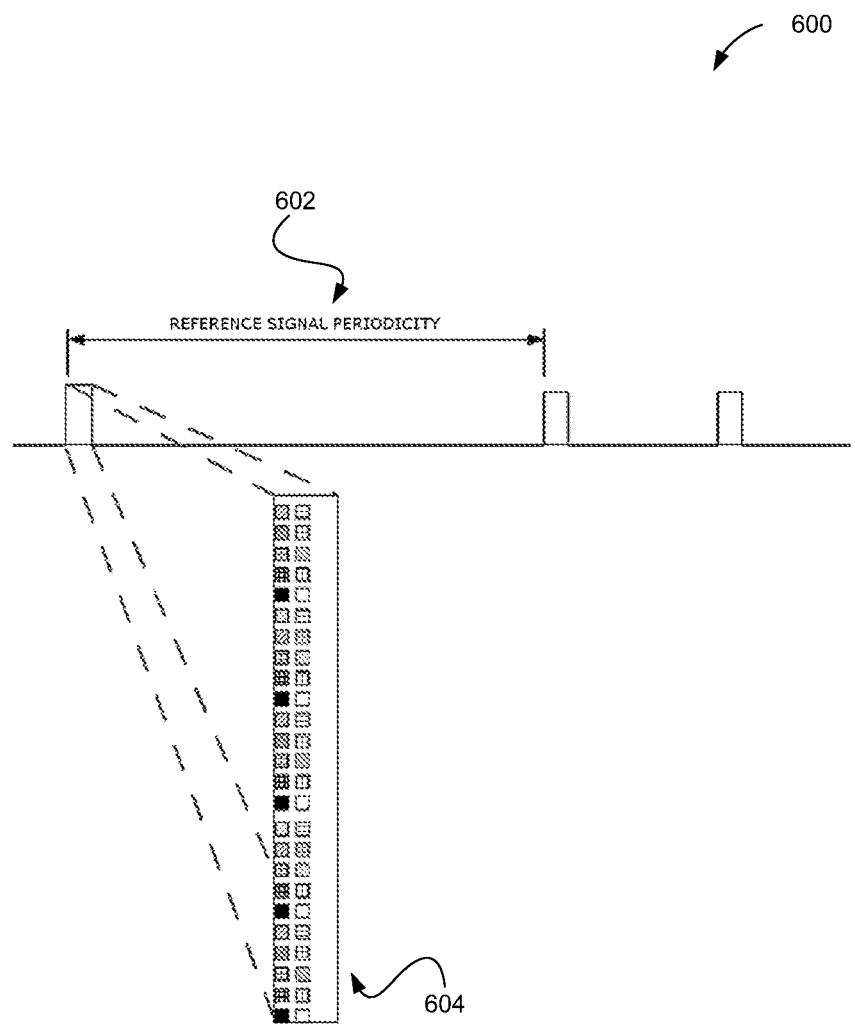
FIG. 6 illustrates a resource allocation for reference signals used to perform measurements that, in turn, support the selection of a network coding message set, in accordance with one embodiment.

FIG. 6 illustrates a resource allocation 600 for reference signals 602 used to perform measurements that, in turn, support the selection of a network coding message set, in accordance with one embodiment. As an option, the resource allocation 600 may be implemented in the context of any one or more of the embodiments set forth in any previous and/or subsequent figure(s) and/or description thereof. However, it is to be appreciated that the resource allocation 600 may be implemented in the context of any desired environment.

As shown, a plurality of vehicles is assigned resources 604 to transmit the reference signals 602 periodically. Such resources 604 are designated for reference signal transmission on a vehicle-to-vehicle communication channel (e.g. side-link communication channel, etc.). Further, the resources 604 for multiple reference signals 602 may be multiplexed. Still yet, each reference signal 602 may be scrambled during transmission using a unique identifier of an associated vehicle. In yet another example, each reference signal 602 may be generated by a pseudo-random generator (e.g. a shift register) whose initialization seed is a function of a unique identifier. In still yet another example, the reference signal may take a form of a sounding reference signal.

During use, each vehicle performs periodic reference signal power measurements of all other vehicles that transmit corresponding reference signals. Further, each vehicle performs filtering of the measurements using a moving average filter or an infinite impulse response (IIR) filter, such as a leaky bucket model ($y(n)=a\, y(n-1)+(1-a)\, x(n)$, where $x(n)$ is the measurement at time n, $y(n)$ is the filtered value at time n, and a is filter coefficient). Parameters for such filtering may be configured by the network or may be specified in a standard.

After such filtering, the vehicles may report the filtered reference signal power measurements to the network (e.g. one or more base stations). In various embodiments, the reporting procedure may involve reporting all filtered measurements periodically with a certain periodicity, or reporting only those measurements that have changed by more than a threshold value since the last measurement report. Reporting only measurements that have changed significantly may potentially reduce measurement reporting overhead and generally avoid, at least in part, reporting measurements of vehicles moving in the same direction and about the same speed.

In other embodiments, the vehicles may estimate a block error probability for reception of a hypothetical (e.g. reference) transmission (e.g. a transmission of a predefined packet size, at a pre-defined transmit power and/or a pre-defined modulation and coding). In such embodiments, the vehicles may determine and report (via wireless transmission) the estimated reference block error probability to the network, and/or the vehicles may indicate which links (and associated messages) have a reference block error probability that is lower than a threshold block error probability.

Still yet, in other embodiments, the vehicles may report their location coordinates to the base station periodically. Based on distances between pairs of vehicles, the network may identify the network coding packet set. For example, vehicles close to each other geographically and with no obstructions may be considered in one group. It is likely that vehicles in that group have a high probability of receiving messages successfully from each other.

Figure 7:
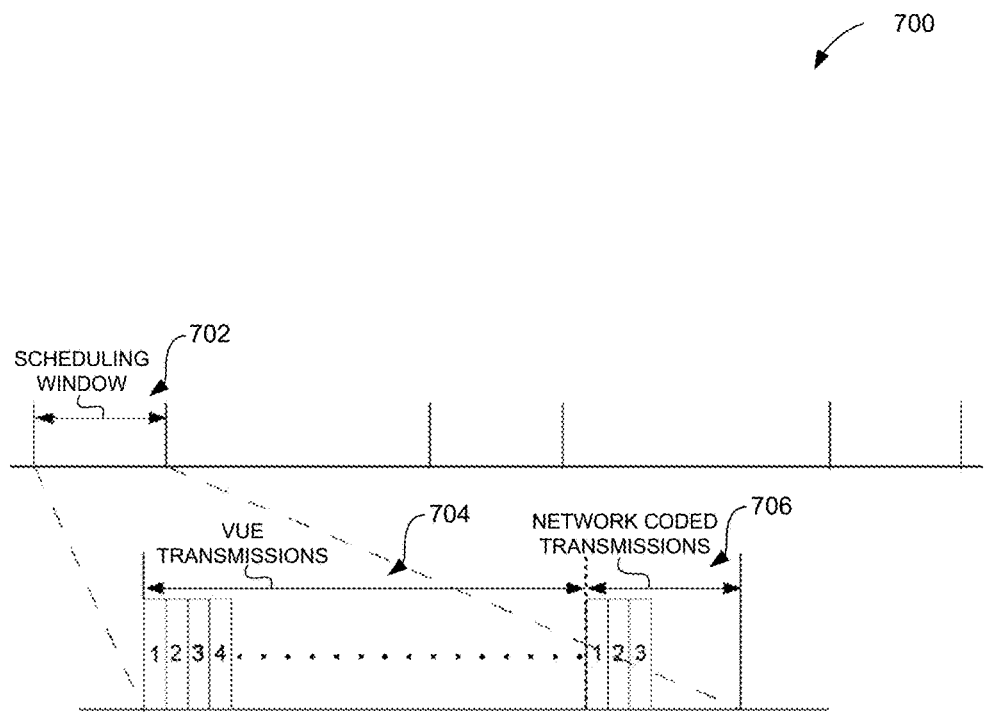
FIG. 7 illustrates a technique for scheduling the transmission of vehicular messages and composite messages, in accordance with one embodiment.

FIG. 7 illustrates a technique 700 for scheduling the transmission of vehicular messages and composite messages, in accordance with one embodiment. As an option, the technique 700 may be implemented in the context of any one or more of the embodiments set forth in any previous and/or subsequent figure(s) and/or description thereof. However, it is to be appreciated that the technique 700 may be implemented in the context of any desired environment.

As shown, a plurality of periodically occurring time periods (e.g. windows in the form of scheduling windows 702) are allocated for transmission of the vehicle-to-vehicle messages based on a recognition that safety requirements require periodic reporting of various types of vehicle status and sensed information. Further, each scheduling window 702 is organized into two time segments, a first time segment 704 for communication of the aforementioned vehicle-to-vehicle messages and a second time segment 706 for communication of the composite messages.

By this design, resources (e.g. time periods) may be allocated (by the base station) within the first time segment 704 for each vehicle to perform vehicle-to-vehicle broadcast transmissions during a vehicle-specific time period. Further, the base station decodes the vehicle transmissions and constructs network coded packets, so that network coded packets may be transmitted in the second time segment 706. As an option, a start of the two time segments 704, 706 is indicated to the vehicles, so that scheduling may be properly administered.

In operation, the base station monitors and attempts to decode all vehicle transmissions, and stores successfully decoded packets until an end of each scheduling window 702. As an option, vehicle communications may be performed on a dedicated carrier (e.g. a carrier used exclusively for vehicular communication) or may be on a carrier shared with other types of data.

As shown in FIG. 7, the vehicle transmissions are time-division multiplexed within the first time segment 704. It should be noted that, in other embodiments, the vehicle transmissions may also be frequency-division multiplexed. Further, the time periods for vehicle transmissions may be uniquely identified (e.g. numbered sequentially), as shown.

In yet another possible embodiment, the transmission of the network coded packet may indicate the time periods corresponding to the network coding set. For example, returning again to the exemplary scenario outlined in table 200 of FIG. 2, suppose that the network coding set includes vehicles 1, 2 and 4; and the time periods assigned to those vehicles are 8, 10 and 15, respectively. In such scenario, an indication may be provided, along with the network coded composite message 1, that the constituent packets (of the composite message) are those corresponding to time periods 8, 10 and 15. Further, network coding coefficients $\alpha_{i,1}$, $\alpha_{i,2}$, ..., $\alpha_{i,n} \in GF(K)$ required for decoding the network coded composite message $N_i$ may be predefined (e.g. advertised in system information or fixed in a standard protocol specification), or the coefficients may be signaled in the network coded composite message as part of a header (which is not subject to the network coding operation).

In use, each vehicle stores packets it receives directly and successfully decodes from other vehicles. However, if there are time periods during which the vehicle is not able to decode a transmission from another vehicle, the vehicle monitors the network coded composite messages from the base station. Upon receipt of such composite messages, the vehicle uses the stored packets received directly from other vehicles in addition to the network coded composite messages received from the base station, in order to recover the messages that were not received.

In different embodiments, the base station may determine the network coding set before a start of the scheduling window 702 and only attempt to decode and store the packets from vehicles in the network coding set. Thus, the base station may avoid storage and/or processing of messages (e.g. the first messages of FIGS. 1-3, etc.) that are not used in composite message generation. This may afford efficiencies in administering the protocol disclosed herein. In yet another embodiment, at a start of the scheduling window 702, a control message may be sent (e.g. to the vehicles) which indicates which time periods are actually assigned for vehicle transmissions. This, in turn, may ensure that a vehicle does not attempt to decode a packet in a time period during which there is no vehicle transmission, thereby providing additional potential efficiencies.

Figure 8:
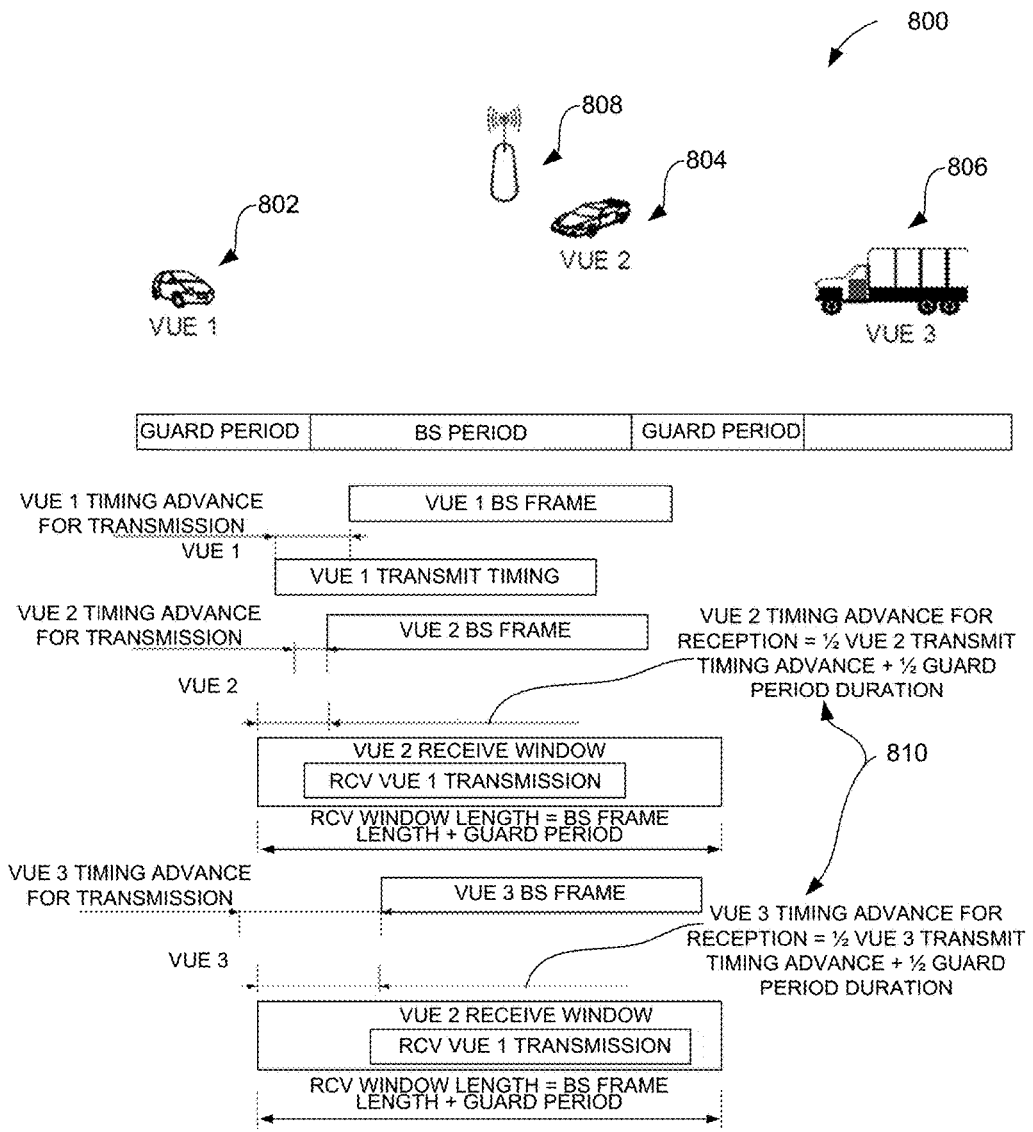
FIG. 8 illustrates a technique for enabling time alignment across multiple links, in accordance with one embodiment.

FIG. 8 illustrates a technique 800 for enabling time alignment across multiple links, in accordance with one embodiment. As an option, the technique 800 may be implemented in the context of any one or more of the embodiments set forth in any previous and/or subsequent figure(s) and/or description thereof. However, it is to be appreciated that the technique 800 may be implemented in the context of any desired environment.

As shown, technique 800 includes timing advance for vehicle user equipment (VUE) 1 802, VUE 2 804, and VUE 3 806. Further, the timing advance for transmission occurs with the base station 808. In one embodiment, time alignment across multiple links may provide for vehicle transmissions to be received by other vehicles (including any of 802-806) and by the base station 808, as well as for base station transmissions to be received by vehicles (including any of 802-806). Additionally, the base station frame timing may be used as a reference timing.

In a variety of time windows, a vehicle (one of 802-806) transmits to the base station 808 and to other vehicles (one or more of 802-806). Further, in order to transmit to the base station 808 on an uplink, as well as to ensure that a timing of received messages is aligned across all vehicles transmitting on the uplink, the transmitting vehicle is assigned a timing advance. Such a timing advance enables transmission to the base station 808 (i.e. packets are received during the time period where the base station accepts packets), but may not be adequate to support transmission to other vehicles (such as 802-806). As such, in order to enable direct communication between vehicles, additional guard periods may be provided between frames. Vehicles receiving transmission from other vehicles may thus use a receive time window that is longer than the frame length. This, in turn, may allow for reception of transmissions of VUE 1, 2 and/or 3 802-806 (or any device) at different distances.

With continuing reference to technique 800, VUE 1, 2 and 3 802-806 are shown in communication with base station 808. Through the course of such communication, a vehicle (one of VUE 1, 2 or 3 802-806) transmitting in the first segment uses the assigned timing advance (as it does for uplink transmissions to the base station 808). A vehicle (such as VUE 2 804 and/or VUE 3 806) receiving a transmission during the first segment uses a timing advance 810 for its receive window with a value equal to half its assigned timing advance, plus half the guard period length. The length of the receive window is thus equal to the frame length plus the guard period length.

It should be noted that the foregoing timing advance/guard period framework may be used in other embodiments, without necessarily using composite messages and/or any other features described herein. In such embodiment, included is a vehicular network interface configured to receive a transmit timing advance from a base station. Also included is circuitry (in communication with the vehicular network interface) that may be configured to control message transmission to one or more vehicles utilizing the vehicular network interface, based on the transmit timing advance. Further, such circuitry may be configured to control message receipt from at least one of the vehicles utilizing the vehicular network interface, based on the transmit timing advance and a guard period. As an option, the message receipt may be controlled by identifying a start time of a reception window, based on the transmit timing advance and the guard period. As a further option, the guard period may reside between successive frames in a sequence of frames.

With that said, in one possible embodiment, the foregoing guard period feature may be applied in the context of the embodiments of FIGS. 1-4 (involving first/second messages/vehicle subsets, etc.) where the base station apparatus may be configured to assign each of the first subset of the set of vehicles with a receive timing for use by the first subset of the set of vehicles to schedule receipt of different messages from different vehicles, where the receive timing is based on a transmit timing advance and a guard period. Further, in another embodiment, the foregoing guard period feature may be applied in the context of the embodiments of FIGS. 1-4 where the disclosed vehicular apparatus may be configured to receive the first messages utilizing a receive timing that is based on a transmit timing advance of the vehicular apparatus and a guard period.

As mentioned earlier, in still other embodiments, the foregoing embodiment may be applied to mobile devices beyond vehicles. In such embodiment, the base station may be configured to receive a first transmission from a first mobile device during a first time period. The base station may be further configured to receive a second transmission from a second mobile device during a second time period following a guard period after the first time period. In use, the base station may refrain from transmissions during the guard period. Further, a length of the guard period may be based on a maximum propagation delay corresponding to the base station.

As an option, the first mobile device and the second mobile device may belong to a set of mobile devices, and the first transmission and the second transmission are transmissions may be directed to other mobile devices in the set of mobile devices. Further, the base station may be further configured to receive a third transmission directly (e.g. intended to be received by the base station, without communication between vehicles, etc.) from a third mobile device during a third time period occurring prior to the first time period. In connection with such third transmission, no guard period is used between the third time period and the first time period. In one embodiment, this is because no guard period is needed between the direct message time period, and the device-to-device message time period.

Figure 9:
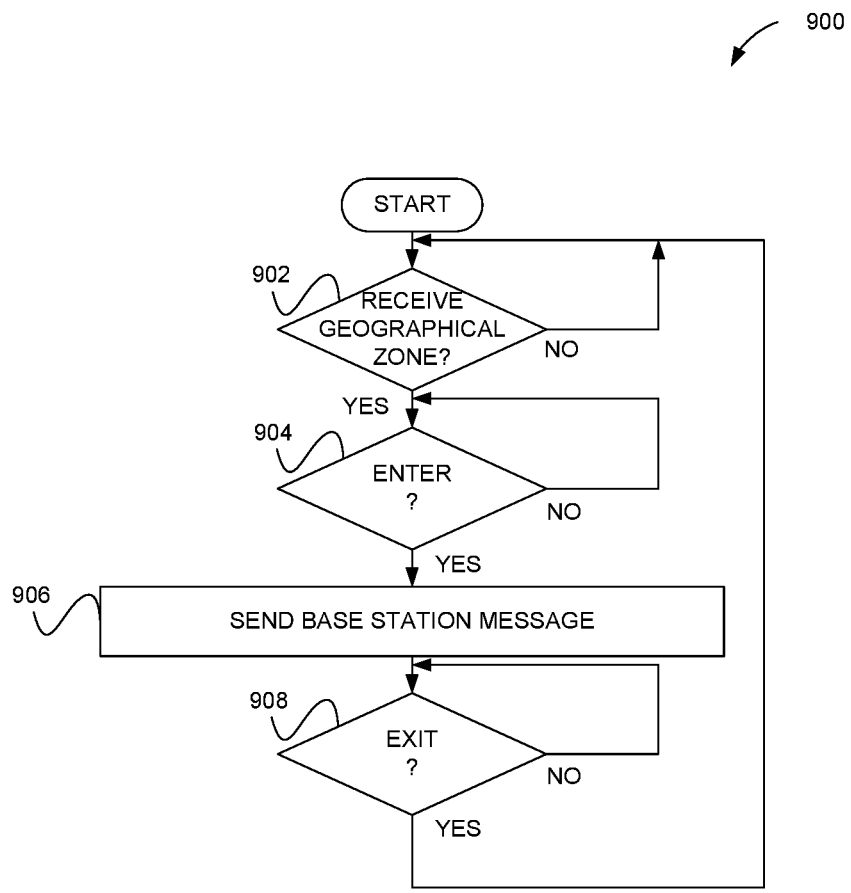
FIG. 9 shows a method for determining vehicles located within a geographic zone, in accordance with one embodiment.

FIG. 9 shows a method 900 for determining vehicles located within a geographic zone, in accordance with one embodiment. As an option, the method 900 may be implemented in the context of any one or more of the embodiments set forth in any previous and/or subsequent figure(s) and/or description thereof. For example, the method 900 may be carried out using the table 200 of FIG. 2, the framework 500 of FIG. 5, the reference signals 602 and the resource allocation 600 of FIG. 6, and/or the technique 700 of FIG. 7 for scheduling the transmission of vehicular messages and composite messages. However, it is to be appreciated that the method 900 may be implemented in the context of any desired environment.

As shown, the method 900 may be used so that a base station may determine which vehicles are within a set zone (e.g. intersection, etc.). Such determination may be based in part on receipt of a zone entry message from the vehicles. In decision 902, it is determined if a geographical zone is received. The base station may indicate the geographical zone where the message will be generated. In one embodiment, the geographical zone may be defined by coordinates, or by a pattern (e.g. square, circle) around a set point (e.g. intersection). If a vehicle enters the geographical zone defined by the coordinates or the pattern (based on its knowledge of location coordinates), such vehicle generates a zone entry message and transmits the same to the base station.

This geographical zone may be signaled to the vehicles in a broadcast message, such as a system information block (SIB) or SIB-equivalent. Additionally, although a larger geographical zone may result in higher feedback, the broadcast message may be transmitted at a power that is appropriate to reach the intended geographical zone (i.e. it may be transmitted at a lower power than other system information messages).

In decision 904, it is determined if a vehicle has entered the geographical zone. If so, in operation 906, the vehicle sends a message to the base station. In one embodiment, the message may include a portion of the information displayed in table 200 of FIG. 2. For example, a vehicle may indicate from which vehicles it may not be able to receive messages. In decision 908, if it is determined that a vehicle (or device) has exited the geographical zone, the method 900 recommences. As an another option, when a vehicle leaves a geographical zone, the vehicle may send a message to the base station.

As such, through use of a geographical zone, a base station may restrict the geographical zone which, in like manner, may restrict the number of vehicles found. In this manner, a base station may minimize retransmission of unsuccessful messages by restricting the geographical zone.

In one embodiment, the base station may broadcast the list of vehicles (e.g. within the geographical zone) in order to limit vehicle feedback. Therefore, the information reported by vehicles (e.g. as shown in operation 906) is limited to only a subset of the vehicles. As an option, a vehicle may determine itself whether the other vehicles are within the geographical zone by decoding a cooperative awareness message (CAM) or equivalent.

In another embodiment, having vehicles send messages to the base station (in response to receiving geographical zone from base station) may be avoided by having the base station monitor interface PC5 links (that include a direct interface between two devices), in a manner similar to how a vehicle would operate. In response, the base station may then determine which vehicles are within/outside the geographical zone. Such an approach may also reduce vehicle signaling. However, to ensure that no vehicle is missed, a deployment/cost of the base station may be increased by installing distributed antennas to eliminate any blind spot(s) in the geographical zone.

Figure 10:
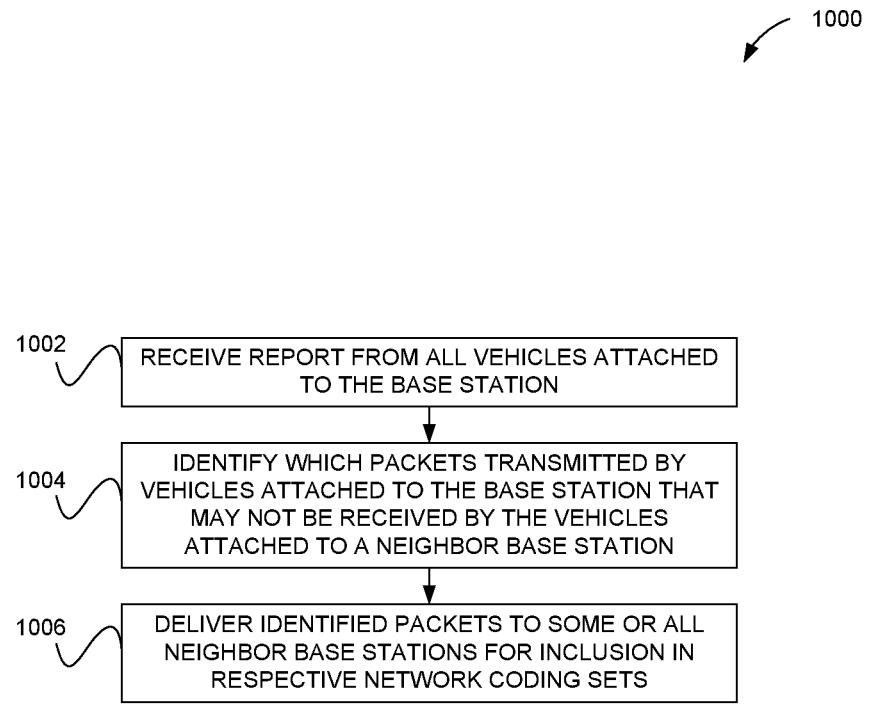
FIG. 10 shows a method for enabling communication between vehicles attached to different base stations, in accordance with one embodiment.

FIG. 10 shows a method 1000 for enabling communication between vehicles attached to different base stations, in accordance with one embodiment. As an option, the method 1000 may be implemented in the context of any one or more of the embodiments set forth in any previous and/or subsequent figure(s) and/or description thereof. For example, the method 1000 may be carried out utilizing the table 200 of FIG. 2, the framework 500 of FIG. 5, the reference signals 602 and the resource allocation 600 of FIG. 6, and/or the technique 700 of FIG. 7 for scheduling the transmission of vehicular messages and composite messages. However, it is to be appreciated that the method 1000 may be implemented in the context of any desired environment.

As will now be set forth, techniques may be provided to assist packet delivery across cell boundaries. For example, in one embodiment, all vehicles attached to a first base station may be configured to perform measurements of other vehicles and report any measurements. If a first vehicle includes a measurement of a second vehicle in its report, but the first base station does not receive a measurement report from the second vehicle, this may indicate that the second vehicle is attached to a different base station.

As shown in step 1002, a report is received from all vehicles attached to the base station. The base station determines a set of any adjacent cell vehicles (e.g. vehicles attached to a neighbor base station) whose measurements have been reported but are not attached to the base station. As such, per step 1004, the base station identifies packets transmitted by vehicles attached to the base station that may not be received by the vehicles attached to a neighbor base station. In one embodiment, such identification may be based on the measurement information (i.e. measurements of vehicles which have been reported but which are not attached to the base station).

In step 1006, the base station delivers identified packets to some or all neighbor base stations for inclusion in respective network coding sets. In one embodiment, such packets may be delivered using inter-base station communication links. Additionally, the neighbor base stations may include the received packets in the network coding set. In one embodiment, the transmitted network coded packets are computed using the packets received over the inter-base station communication links, in addition to packets received from any vehicles within the geographical zone associated with the base station. Further, for a packet received from another base station, the base station transmitting the network coded packet may indicate: 1) the time period when the packet was transmitted in the other base station, as well as 2) information indicating that the packet originated from a different base station.

In this manner, delivering identified packets to all neighbor base stations allows for base stations to cooperate in ensuring that all tables (e.g. indicating unsuccessful packets) may be correctly populated. Additionally, adjacent base stations may take relevant information (i.e. from the tables indicating unsuccessful packets) and include such in the base station network coordinated packet transfer.

In another embodiment, a base station may indicate pairs (e.g. <vi, vj>, etc.) of vehicles to all neighboring base stations. Such pairs may indicate that vi, for example, is attached to a first base station and vj is not attached to the first base station. Additionally, vj may be unlikely to receive a packet based on the measurement (i.e. measurements of vehicles which have been reported but which are not attached to the base station). Each neighboring base station may check each pair to determine whether a corresponding vj is attached to the respective base station and, if so, the base station may include packets transmitted by vi in its network coding set. In this manner, using pairs may facilitate greater flexibility in efficiency reporting which vehicles are attached to which base station.

Further, in another embodiment, the reference signal transmitted by a vehicle may be scrambled with a base station identifier to which the vehicle is attached. Such may facilitate reporting in the vehicle measurement report where the vehicle indicates vehicles attached to a neighbor base station.

Thus, in one embodiment, the foregoing features may be applied in the context of the embodiments of FIGS. 1-4 where the base station network interface of a particular base station apparatus may be further configured (under the control of relevant circuitry) to transmit the composite messages to another base station network interface of another base station apparatus for use by the another base station apparatus. As an option, the base station network interface may be further configured to transmit the composite messages to the another base station network interface, based on measurements received from a plurality of the vehicles. As yet another option, the base station network interface may be further configured to transmit the composite messages to the another base station network interface, based on information (e.g. vehicle pair information, etc.) shared between the base station apparatus and the another base station apparatus.

Figure 11:
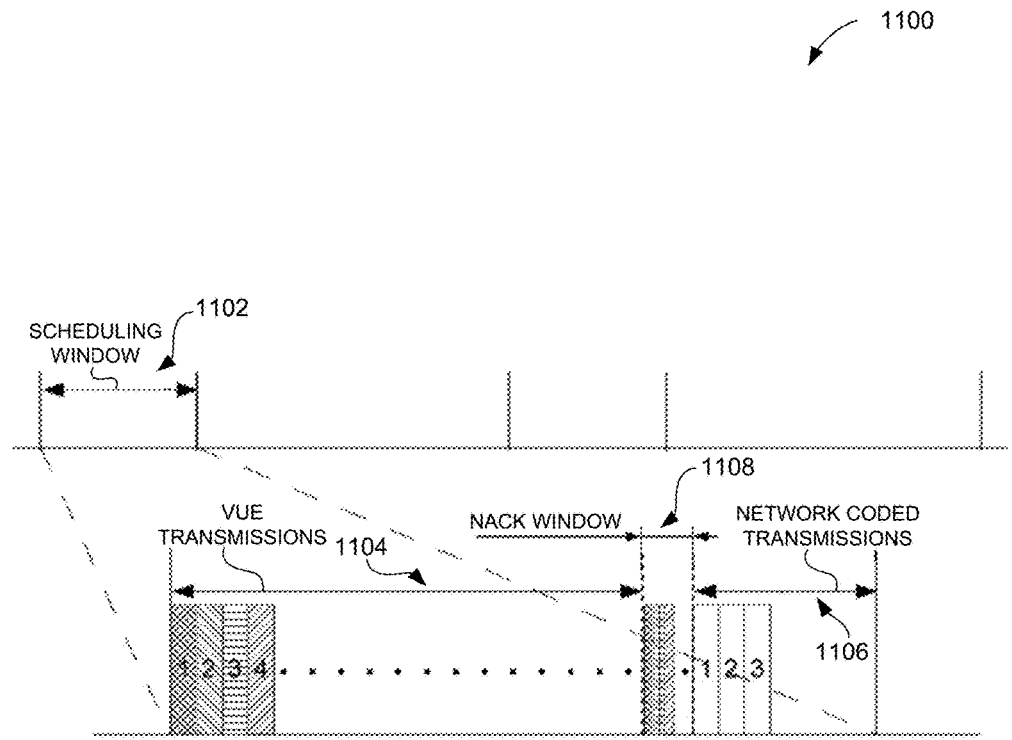
FIG. 11 illustrates a technique for scheduling the transmission of vehicular messages and composite messages, in accordance with one embodiment.

FIG. 11 illustrates a technique 1100 for scheduling the transmission of vehicular messages and composite messages, in accordance with one embodiment. As an option, the technique 1100 may be implemented in the context of any one or more of the embodiments set forth in any previous and/or subsequent figure(s) and/or description thereof. However, it is to be appreciated that the technique 1100 may be implemented in the context of any desired environment.

As shown, a plurality of periodically occurring time windows (e.g. scheduling windows 1102) are allocated for transmission of the vehicle-to-vehicle messages based on a recognition that safety requirements require periodic reporting of various types of vehicle status and sensed information. Further, each scheduling window 1102 is organized into three time segments, a first time segment 1104 for communication of the aforementioned vehicle-to-vehicle messages, a second time segment 1108 for communication of a NACK message, and a third time segment 1106 for communication of the composite messages.

In one embodiment, the first time segment 1104 may correspond in description to the first time segment 704, and the third time segment 1106 may correspond in description to the second time segment 1106.

Resources (e.g. time periods) may be allocated (by the base station) within the first time segment 1104 for each of the vehicles to perform vehicle-to-vehicle broadcast transmissions during a vehicle-specific time period. In one embodiment, the first time segment 1104 may occur periodically. In the second time segment 1108, NACKs may be transmitted by vehicles that fail to receive transmissions from other vehicles. In the third time segment 1106, the base station may perform network coded packet transmissions, based on the NACKs received in the second time segment 1108.

In operation, the base station monitors and attempts to decode all vehicle transmissions, and stores successfully decoded packets until an end of the NACK window, the third time segment 1108. As an option, vehicle communications may be performed on a dedicated carrier (i.e. a carrier used exclusively for vehicular communication) or may be on a carrier shared with other types of data.

With continuing reference to FIG. 11, the vehicle transmissions are time-division multiplexed within the first time segment 1104. It should be noted that, in other embodiments, the vehicle transmissions may also be frequency-division multiplexed. Further, the time periods for vehicle transmissions may be uniquely identified (e.g. numbered sequentially), as shown.

A vehicle transmits its packet during the time period assigned (by the base station) for its transmission and monitors for transmissions from other vehicles and attempts to decode such transmissions. Vehicles transmit NACKs for transmissions that are not received in the second time segment 1108. The base station receives the NACKs and, based on the NACKs received, constructs the network coding set. In the third time segment 1106, the base station transmits network coded packets based on the packets in the network coding set.

As described before, the transmission of the network coded packet may indicate the time periods corresponding to the network coding set. Network coding coefficients $\alpha_{i,1}$, $\alpha_{i,2}, \ldots, \alpha_{i,n} \in GF(K)$ required for decoding the network coded composite message $N_i$ may be predefined (e.g. advertised in system information or fixed in a standard protocol specification), or the coefficients may be signaled in the network coded composite message as part of a header (which is not necessarily subject to the network coding operation).

In use, each vehicle stores packets it receives directly and successfully decodes from other vehicles. However, if there are time periods during which the vehicle is not able to decode a transmission from another vehicle, the vehicle monitors the network coded transmission from the base station. Upon receipt of such composite messages, the vehicle uses the stored packets received directly from other vehicles in addition to the network coded packets received from the base station, in order to recover the messages that were not received.

For vehicular safety applications, delivery of messages with a very high reliability may be desired in some embodiments. Given that the network coded transmissions by the base station rely on receiving NACKs correctly (i.e. if a NACK is not received, the packet is not included in the network coding set), delivery of messages may be compromised. It may thus be desirable to ensure that the probability of NACK reception errors is much lower than the probability of packet reception error. More information will now be set forth regarding various techniques for transmitting NACKs with low error probability.

Figure 12A:
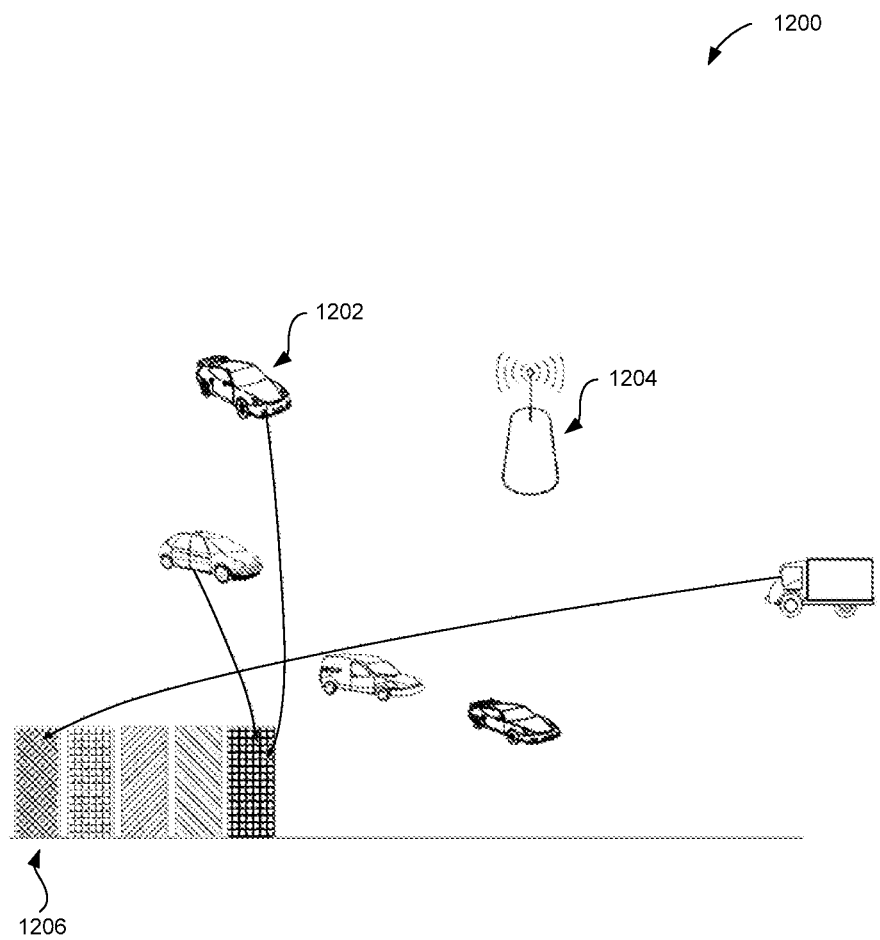
FIG. 12A illustrates a system for supporting synchronized negative acknowledgement (NACK) signal transmission by vehicles, in accordance with one embodiment.

FIG. 12A illustrates a system 1200 for supporting synchronized NACK transmission by vehicles, in accordance with one embodiment. As an option, the system 1200 may be implemented in the context of any one or more of the embodiments set forth in any previous and/or subsequent figure(s) and/or description thereof. Just by way of example, the system 1200 may use the table 200 of FIG. 2, the technique 800 used to enable time alignment across multiple links, etc. However, it is to be appreciated that the system 1200 may be implemented in the context of any desired environment.

As shown, the system 1200 includes one or more vehicles 1202, a base station 1204, and NACK resources 1206. The NACK resources 1206 may include a separate resource allocated in the NACK window corresponding to each time period in the vehicle transmissions time segment. A vehicle that fails to receive a transmission in the i-th vehicle transmission time period, for example, transmits a NACK in the NACK resource corresponding to the i-th vehicle transmission time period. All vehicles that do not receive and decode the i-th transmission transmit the NACK. The NACK transmission by each vehicle is time-aligned (using the assigned timing advance 810) and all such vehicles transmit an identical signal. In one embodiment, the resulting summed signal (i.e. aggregation of identical individual vehicle NACK signals) is received by the base station and a NACK signal is detected. The synchronized transmission of the NACK signal by more than one vehicle increases the signal-to-interference-plus-noise ratio (SINR) of the received NACK signal, thereby reducing the probability of NACK errors.

In another embodiment, the base station may poll vehicles and each polled vehicle may indicate the transmissions that have not been decoded as a bit map. Such a technique may be enabled since the base station may determine whether there is at least one vehicle that has not received a transmission in the first time segment (i.e. it may not be necessary to poll all vehicles).

Thus, in one embodiment, the foregoing NACK-related feature may be applied in the context of the embodiments of FIGS. 1-4 (involving first/second messages/vehicle subsets, etc.) where the aforementioned base station apparatus is configured to receive NACKs for the second subset of the set of vehicles, and select the second messages for use in generating the composite messages, based on the NACK signals. As set forth above during the description of FIG. 12A, the NACK signals for the second subset of the set of vehicles may be each received during a time period of a corresponding one of the second subset of the set of vehicles. Further, the NACK signals received from different vehicles during the time period may be aggregated in the form of an aggregated NACK signal. As yet another option, the NACK signals for the second subset of the set of vehicles may each be received in response to a request transmitted by the base station (e.g. polling, etc.).

Further, in another embodiment, the foregoing NACK-related feature may be applied in the context of the embodiments of FIGS. 1-4 where the aforementioned vehicular apparatus may be configured to transmit NACK signals for the second subset of the set of vehicles for use by the base station in selecting the second messages to use when generating the composite messages. As an option, the NACK signals for the second subset of the set of vehicles may be each transmitted during a time period of a corresponding one of the second subset of the set of vehicles. Further, the NACK signals transmitted by different vehicles during the time period may be aggregated in the form of an aggregated NACK signal. As yet another option, the NACK signals for the second subset of the set of vehicles may be each transmitted in response to a request received from the base station. As still yet another option, the NACK signals for the second subset of the set of vehicles may each be generated utilizing at least one NACK signal received from at least one of the vehicles.

Figure 12B:
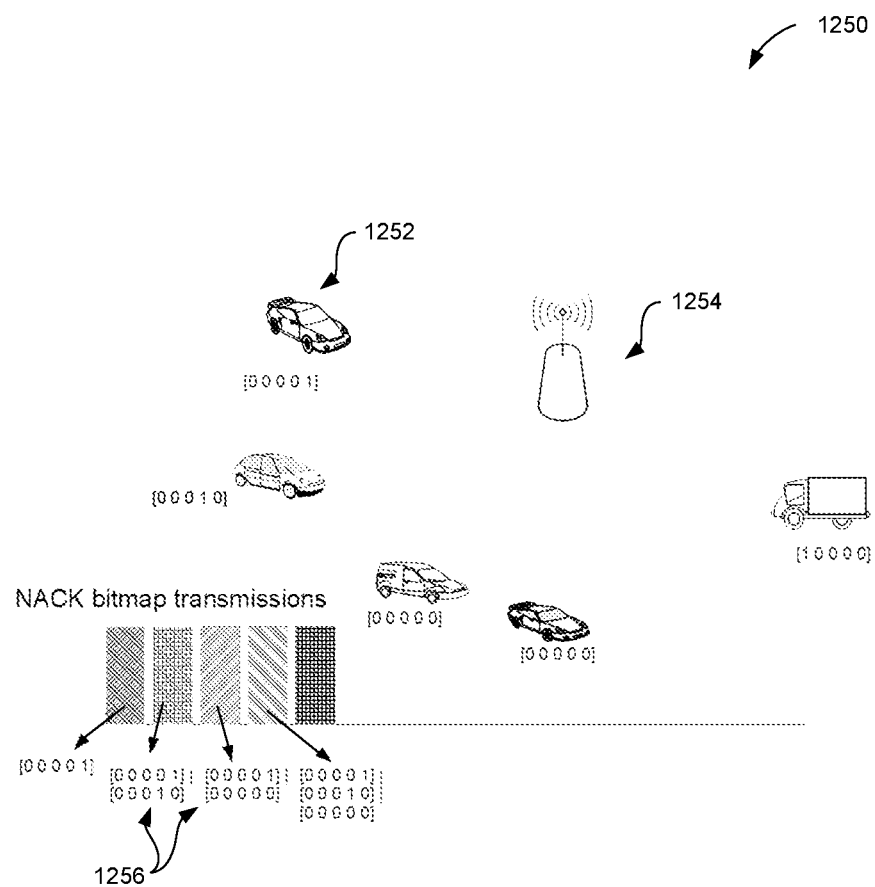
FIG. 12B illustrates a system that schedules vehicles to transmit a bit map indicating NACKs within a NACK window, in accordance with another embodiment.

FIG. 12B illustrates a system 1250 that schedules vehicles 1252 to transmit a bit map 1256 indicating NACKs within a NACK window, in accordance with another embodiment. As an option, the system 1250 may be implemented in the context of any one or more of the embodiments set forth in any previous and/or subsequent figure(s) and/or description thereof. For example, the system 1250 may use the table 200 of FIG. 2, the technique 800 used to enable time alignment across multiple links, etc. However, it is to be appreciated that the system 1250 may be implemented in the context of any desired environment.

As shown, the system 1250 includes one or more vehicles 1252, a base station 1254, and a bit map 1256 indicating NACKs within a NACK window. In use, a first one of the vehicles 1252 in a sequence transmits the bit map of the first vehicle, indicating the transmissions in the first segment that were not decoded (i.e. indicate which packets were not received). The second vehicle decodes the NACK bitmap transmitted by the first vehicle and performs an OR operation with the bit map corresponding to transmissions in the first segment that were not decoded by the second vehicle. In such an example, vehicle vk receives NACK bit maps transmitted by vehicles v1 . . . vk−1. In response, vehicle vk performs an OR operation on the bit maps vehicle vk receives and vehicle vk's NACK bit map, and transmits the resulting bit map. The base station receives (or attempts to receive) as many of the bitmaps as possible and performs an OR operation of the received bitmaps. In this manner, even if some individual NACK bitmap transmissions are not received directly by the base station, the information about the packets needing to be transmitted by the base station is still delivered.

Thus, in various embodiments, vehicle-to-vehicle communication utilizing a base station may be used to improve spectral efficiency. For example, such techniques may be used for a directional reception at a base station by: 1) enabling a base station to receive vehicle transmissions from different directions which may provide better resource usage for vehicle transmissions; 2) facilitating power control (which can be set to allow a base station to hear); 3) permitting collisions in vehicle transmissions, and yet, still enabling receipt of packets at the base station; and 4) allowing for prioritization of message delivery to nearer vehicles.

Figure 13:
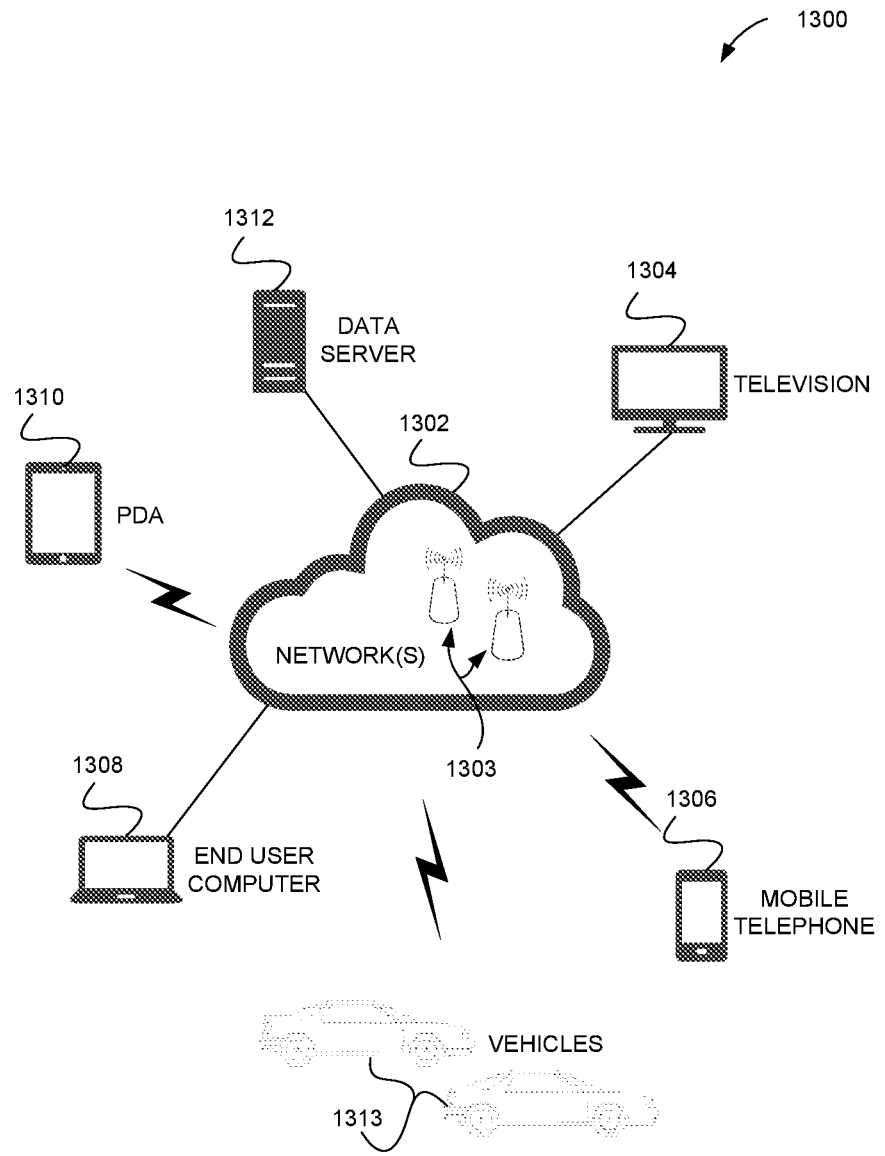
FIG. 13 illustrates a network architecture, in accordance with one embodiment.

FIG. 13 illustrates a network architecture 1300, in accordance with one embodiment. As shown, at least one network 1302 is provided that includes one or more base stations 1303. In various embodiments, any one or more components/features set forth during the description of any previous figure(s) may be implemented in connection with any one or more of the components of the at least one network 1302.

In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1312 and an end user computer 1308 may be coupled to the network 1302 for communication purposes. Such end user computer 1308 may include a desktop computer, lap-top computer, and/or any other type of logic. Still yet, various other devices may be coupled to the network 1302 including a personal digital assistant (PDA) device 131o, a mobile phone device 1306, a television 1304, etc. Even still, the devices may include one or more vehicles 1313.

Figure 14:
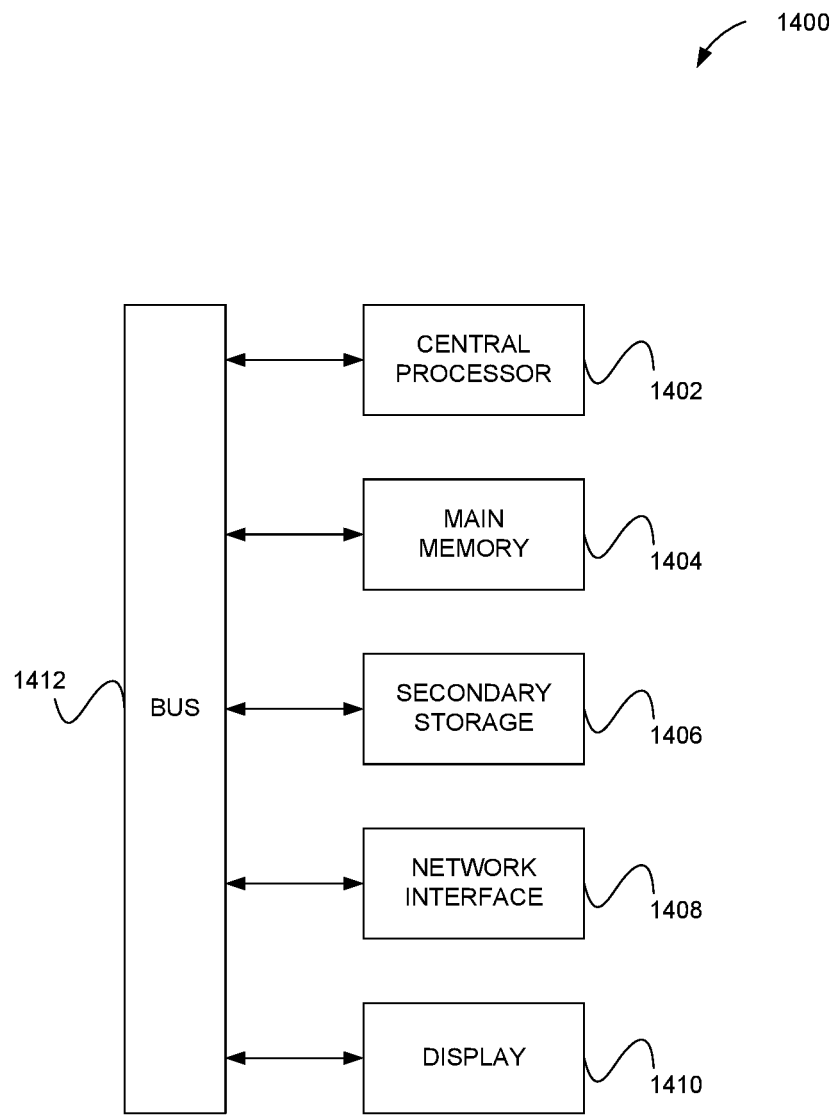
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. For example, the system 1400 may be implemented in the context of the vehicles 1313 and/or the base stations 1303 of FIG. 13. However, it is to be appreciated that the system 1400 may be implemented in any desired environment.

As shown, a system 1400 is provided including at least one central processor 1402 which is connected to a bus 1412. The system 1400 also includes main memory 1404 [e.g., hard disk drive, solid state drive, random access memory (RAM), etc.]. The system 1400 also includes a network interface 1408 and a display 1410. In various embodiments, such network interface 1408 may include any transceiver and/or related circuitry/componentry that enables wireless communication.

The system 1400 may also include a secondary storage 1406. The secondary storage 1406 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1404, the secondary storage 1406, and/or any other memory, for that matter. Such computer programs, when executed, enable the system 1400 to perform various functions (as set forth above, for example). Memory 1404, secondary storage 1406 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital versatile disc (DVD), a high definition DVD (HD-DVD™), a BLU-RAY disc; and the like.

Figure 15:
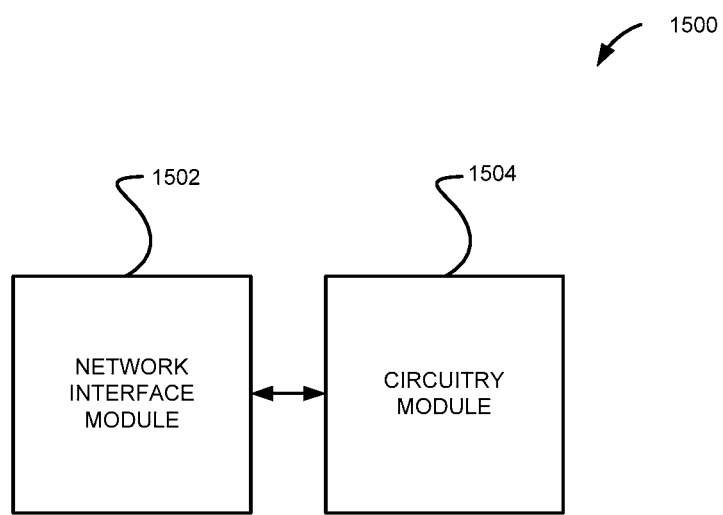
FIG. 15 illustrates a system for facilitating device-to-device communication using a base station, in accordance with one embodiment.

FIG. 15 illustrates a system 1500 for facilitating device-to-device communication using a base station, in accordance with one embodiment. As an option, the system 1500 may be implemented with one or more features of any one or more of the embodiments set forth in any previous figure and/or the description thereof. For example, the system 1500 may be implemented in the context of a vehicle, a base station and/or any mobile device, for that matter. However, it is to be appreciated that the system 1500 may be implemented in the context of any desired environment.

As shown, network interface means in the form of a network interface module 1502 is provided for receiving and/or transmitting messages/signals (e.g. per steps 302/304/308 of FIG. 3 and/or steps 402/404 of FIG. 4, etc.). In various embodiments, the network interface module 1502 may include, but is not limited to the network interface 1408 of FIG. 14, and/or any other component capable of the aforementioned functionality.

Also included is circuitry means in the form of a circuitry module 1504 in communication with the network interface module 1502 for implementing any of the features set forth during the description of previous figures. In various embodiments, the circuitry module 1504 may include, but is not limited to the processor 1402 of FIG. 14, and/or any other circuitry capable of the aforementioned functionality.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as electronic circuitry, such as an instruction execution machine (e.g., a processor-based or processor-containing machine) and/or as specialized circuits (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
a vehicular network interface configured to:
receive, from a first subset of a set of vehicles, first messages, and
receive composite messages that are generated by a base station based on second messages transmitted by a second subset of the set of vehicles; and
circuitry in communication with the vehicular network interface, the circuitry configured to re-create at least a portion of the second messages based on at least a portion of the first messages and at least a portion of the composite messages.

2. The apparatus of claim 1, wherein the second messages are not received by the vehicular network interface.

3. The apparatus of claim 1, wherein the composite messages are generated by network coding the second messages.

4. The apparatus of claim 1, wherein the apparatus is configured to transmit, to the base station, measurements of signals received from at least some of the set of vehicles, for use by the base station in selecting the second messages to use when generating the composite messages.

5. The apparatus of claim 4, wherein the signals include reference signals.

6. The apparatus of claim 1, wherein the apparatus is configured to transmit negative acknowledgement signals for use by the base station in selecting the second messages to use when generating the composite messages.

7. The apparatus of claim 6, wherein the apparatus is configured such that the negative acknowledgement signals are each transmitted during a time period corresponding to another time period of a transmission of one of the second messages.

8. The apparatus of claim 7, wherein the apparatus is configured such that the negative acknowledgement signals transmitted by different vehicles during the time period are aggregated in a form of an aggregated negative acknowledgement signal.

9. The apparatus of claim 1, wherein the apparatus is configured to receive the first messages and the second messages during a first time period, and receive the composite messages during a second time period.

10. The apparatus of claim 1, wherein the apparatus is configured to receive the first messages and the second messages utilizing a receive timing that is based on a transmit timing advance of the apparatus and a guard period.

11. A method, comprising:
receiving, from a first subset of a set of vehicles, first messages, utilizing a vehicular network interface;
receiving, utilizing the vehicular network interface, composite messages that are generated by a base station based on second messages transmitted by a second subset of the set of vehicles; and
re-creating at least a portion of the second messages based on at least a portion of the first messages and at least a portion of the composite messages, utilizing circuitry in communication with the vehicular network interface.

12. A method, comprising:
performing measurements of reference signals transmitted by a set of mobile devices;
transmitting the measurements to a base station;
receiving transmissions of first messages from a first subset of the set of mobile devices;
receiving transmissions of composite messages from the base station; and
recovering, in a scenario in which second messages are transmitted by a second subset of the set of mobile devices but not received from the second subset of the set of mobile devices, the second messages based on the first messages and the composite messages.

13. The method of claim 12, wherein the composite messages include the second messages transmitted by at least a portion of the second subset of the set of mobile devices for which the measurements are below a threshold.

14. An apparatus, comprising:
a first mobile device including:
a network interface configured to receive a reference signal transmitted by a second mobile device; and
circuitry in communication with the network interface, the circuitry configured to perform, at the first mobile device, a measurement of the reference signal transmitted by the second mobile device;
wherein the network interface is further configured to:
transmit the measurement to a base station, and
receive, if the measurement is below a threshold, a message from the base station, the second mobile device also having transmitted the message, such that the first mobile device can recover the message based on the message received from the base station if the message transmitted by the second mobile device is not received by the first mobile device.

15. The apparatus of claim 14, wherein the apparatus is further configured such that the measurement is performed by:
measuring a signal power of the reference signal transmitted by the second mobile device; and
determining a probability of error of a hypothetical packet transmission, where the measurement that is transmitted to the base station includes the probability of error of the hypothetical packet transmission.

16. The apparatus of claim 15, wherein the apparatus is further configured such that the hypothetical transmission is characterized by at least one of a predefined modulation and coding scheme, a predefined size, or a predefined transmit power.

17. A method, comprising:
performing, at a first mobile device, a measurement of a reference signal transmitted by a second mobile device;
transmitting the measurement to a base station; and
receiving, if the measurement is below a threshold, a message from the base station, the second mobile device also having transmitted the message, such that the first mobile device can recover the message based on the message received from the base station if the message transmitted by the second mobile device is not received by the first mobile device.

18. The method of claim 17, wherein the measurement is performed by:
measuring a signal power of the reference signal transmitted by the second mobile device; and
determining a probability of error of a hypothetical packet transmission, where the measurement that is transmitted to the base station includes the probability of error of the hypothetical packet transmission.

19. The method of claim 18, wherein the hypothetical transmission is characterized by at least one of a predefined modulation and coding scheme, a predefined size, or a predefined transmit power.

20. A computer program product comprising a non-transitory computer readable storage medium storing programming, the programming including instructions to:
receive first messages from a first subset of a set of vehicles at a vehicular network interface;
receive composite messages that are generated by a base station based on second messages transmitted by a second subset of the set of vehicles; and
re-create at least a portion of the second messages based on at least a portion of the first messages and at least a portion of the composite messages.

21. The computer program product of claim 20, wherein the second messages are not received by the vehicular network interface.

22. The computer program product of claim 20, wherein the composite messages are generated by network coding the second messages.

23. The computer program product of claim 20, wherein the programming further includes instructions to transmit, to the base station, measurements of signals received from at least some of the set of vehicles, for use by the base station in selecting the second messages to use when generating the composite messages.

24. The computer program product of claim 23, wherein the signals include reference signals.

25. The computer program product of claim 20, wherein the programming further includes instructions to transmit negative acknowledgement signals for use by the base station in selecting the second messages to use when generating the composite messages.

26. The computer program product of claim 25, wherein the negative acknowledgement signals are each transmitted during a time period corresponding to another time period of a transmission of one of the second messages.

27. The computer program product of claim 26, wherein the negative acknowledgement signals transmitted by different vehicles during the time period are aggregated in a form of an aggregated negative acknowledgement signal.

28. The computer program product of claim 20, wherein the first messages and the second messages are received during a first time period, and the composite messages are received during a second time period.

29. The computer program product of claim 20, wherein the first messages and the second messages are received according to a receive timing that is based on a transmit timing advance and a guard period.

30. A computer program product comprising a non-transitory computer readable storage medium storing programming, the programming including instructions to:
perform measurements of reference signals transmitted by a set of mobile devices;
transmit the measurements to a base station;
receive transmissions of first messages from a first subset of the set of mobile devices;
receive transmissions of composite messages from the base station; and
recover, in a scenario in which second messages are transmitted by a second subset of the set of mobile devices but not received from the second subset of the set of mobile devices, the second messages based on the first messages and the composite messages.

31. The computer program product of claim 30, wherein the composite messages include the second messages transmitted by at least a portion of the second subset of the set of mobile devices for which the measurements are below a threshold.

32. A computer program product comprising a non-transitory computer readable storage medium storing programming, the programming including instructions to:
perform, at a first mobile device, a measurement of a reference signal transmitted by a second mobile device;
transmit the measurement to a base station; and
receive, if the measurement is below a threshold, a message from the base station, the second mobile device also having transmitted the message, such that the first mobile device can recover the message based on the message received from the base station if the message transmitted by the second mobile device is not received by the first mobile device.

33. The computer program product of claim 32, wherein the measurement is performed by:
measuring a signal power of the reference signal transmitted by the second mobile device; and
determining a probability of error of a hypothetical packet transmission, where the measurement that is transmitted to the base station includes the probability of error of the hypothetical packet transmission.

34. The computer program product of claim 33, wherein the hypothetical transmission is characterized by at least one of a predefined modulation and coding scheme, a predefined size, or a predefined transmit power.

* * * * *